(12) United States Patent
    Opoku

(10) Patent No.: US 10,865,111 B2
(45) Date of Patent: Dec. 15, 2020

(54) METHOD OF MAKING NANOMATERIALS FROM A RENEWABLE CARBON SOURCE

(71) Applicant: Michael Kwabena Opoku, San Marcos, TX (US)

(72) Inventor: Michael Kwabena Opoku, San Marcos, TX (US)

( * ) Notice: Subject to any disclaimer, the term of this patent is extended or adjusted under 35 U.S.C. 154(b) by 36 days.

(21) Appl. No.: 16/182,506

(22) Filed: Nov. 6, 2018

(65) Prior Publication Data
    US 2019/0144280 A1    May 16, 2019

Related U.S. Application Data

(60) Provisional application No. 62/582,329, filed on Nov. 7, 2017.

(51) Int. Cl.
    *C01B 32/15*       (2017.01)
    *C01B 32/354*      (2017.01)
    *B82Y 30/00*       (2011.01)

(52) U.S. Cl.
    CPC ............ *C01B 32/15* (2017.08); *C01B 32/382* (2017.08); *B82Y 30/00* (2013.01); *C01P 2004/03* (2013.01); *C01P 2006/12* (2013.01); *C01P 2006/14* (2013.01); *C01P 2006/17* (2013.01)

(58) Field of Classification Search
    CPC ... C01B 32/15; C01B 32/382; C01B 2006/17; C01B 2006/14; C01B 2006/12; B82Y 30/00; B82Y 40/00
    See application file for complete search history.

(56) References Cited

U.S. PATENT DOCUMENTS

2014/0134092 A1*   5/2014   Shankman ............ C01B 32/225
                                                         423/415.1

FOREIGN PATENT DOCUMENTS

CN        103833029 A   *   6/2014
CN        107311163 A   *   11/2017

OTHER PUBLICATIONS

Tang, Libin, et al. "Deep ultraviolet photoluminescence of water-soluble self-passivated graphene quantum dots." ACS nano 6.6 (2012): 5102-5110.*
Tang, Libin, et al. "Bottom-up synthesis of large-scale graphene oxide nanosheets." Journal of Materials Chemistry 22.12 (2012): 5676-5683.*
Abdolhosseinzadeh, Sina, Hamed Asgharzadeh, and Hyoung Seop Kim. "Fast and fully-scalable synthesis of reduced graphene oxide." Scientific reports 5 (2015): 10160.*
Jung, Da Hee, et al. "Effects of hydrogen partial pressure in the annealing process on graphene growth." The Journal of Physical Chemistry C 118.7 (2014): 3574-3580.*

(Continued)

*Primary Examiner* — Richard M Rump

(57) ABSTRACT

This patent disclosure includes a process that uniquely and unexpectedly results in the production of extremely high specific surface area and large pore volume carbon nanomaterial with high content of sp2 hybridized carbon-carbon in the form of nanosheets from a renewable carbonaceous raw material. The resulting nanomaterial is in particulate form or porous nanomaterial or dispersed in solvent. This process can also be used to produce carbon nanosheet on substrates or form a nanocomposite with other materials that results in exceptional properties.

19 Claims, 29 Drawing Sheets depicts a schematic of removal of water molecules from glucose unit.

(56) References Cited

OTHER PUBLICATIONS

Chang, Melissa May Fung, et al. "Synthesis of yellow fluorescent carbon dots and their application to the determination of chromium (III) with selectivity improved by pH tuning." Microchimica Acta 183.6 (2016): 1899-1907.*
Van Tam, Tran, et al. "Synthesis of B-doped graphene quantum dots as a metal-free electrocatalyst for the oxygen reduction reaction." Journal of Materials Chemistry A 5.21 (2017): 10537-10543.*
Gerstner, E., "Nobel Prize 2010: Geim and Novoselov," Nature Physics, Advance online Publication, 2010.
Geim, A.K, et al., "The rise of graphene," Nature Materials, 6, 183-191, 2007.
Meyer, J.C. et al., "The structure of suspended graphene sheets," Nature Letters, 446, 2007, 60-61.
Geim, A.K., "Graphene: status and prospects" Science, 324, 2009, 1530-1534.
Novoselov et al., "A roadmap for graphene," Nature Review, 490, 192-200, 2012.
Ferrari et al., "Science and technology roadmap for graphene, related two-dimensional crystals, and hybrid systems," Nanoscale, 7 (11), 2015, 4598-4810.
Rao, C.N.R. et al., "Synthesis, characterization and selected Properties of graphene," Graphene: Synthesis, Properties, and Phenomena, Chapter 1, 1st Ed., © 2013 Wiley-VCH Verlag GmbH & Co. KGaA.
Li, Z., et al., Superstructured assembly of nanocarbons: fullerenes, nanotubes, and graphene, Chemical Reviews, 115, 2015, 7046-7117.
Dreyer, D.R., et al., "The chemistry of graphene oxide," Chem. Soc. Rev., 39, 2010, 228-240.
Jiang, Y., et al., Versatile Graphene Oxide Putty-Like Material, Advanced Materials, 28 (46), 2016, 10287-10292.
Cheng, H., et al., Graphene fiber: a new material platform for unique applications, NPG Asia Materials, 6, 2014, 1-11.
Novoselov, K.S., "Graphene mind the gap," Nature Materials, 6, 2007, 720-721.
Zhou et al., "Substrate-induced bandgap opening in epitaxial graphene," Nature Materials, 6, 2007, 770-775.
Novoselov et al., "Electric field effect in atomically thin carbon films," Science, 306, 2004, 666-669.
Novoselov et al., "Room-temperature quantum hall effect in graphene," Science, 10, 2007, 1.
Ando T., "The electronic properties of graphene and carbon nanotubes," NPG Asia Materials, 1, 2009, 17-21.
Zhang, et al., "Tunable electronic properties of graphene through controlling bonding configurations of doped nitrogen atoms," Scientific Reports, 6, 2016, 28330-28340.
Ponomarenko et al., "Tunable metal-insulator transition in double-layer graphene heterostructures," Nature Physics, 7, 2011, 958-961.
Kim et al.,"A role for graphene in silicon-based semiconductor devices," Nature, 479, 2011, 338-344.
Schwierz, "Graphene transistors," Nature Nanotechnology, 5, 2010, 487-496.
Zhao et. al, "Large-scale chemical assembly of atomically thin transistors and circuits," Nature Nanotechnology, 11, 2016, 954-960.
Wang et al., "Direct Growth of Graphene Film on Germanium Substrate," Scientific Reports, 3, 2013, 2465-2471.
Echtermeyer, T.J., et al., "Strong plasmonic enhancement of photovoltage in graphene," Nature Communications, 2, 2011, 458-463.
Miao, Q., et al., "Magnetic properties of N-doped graphene with high curie temperature," Scientific Reports, 6, 2016, 21832-21842.
Balandin, A.A., "Thermal properties of graphene and nanostructured carbon materials," Nature Materials, 10, 2011, 569-581.
Schedin et. al, "Detection of individual gas molecules adsorbed on graphene," Nature Materials,6, 2007, 652-655.
Deng, D. et. al., "Catalysis with 2D materials and their heterostructures," Nature Nanotechnology, 11, 2016, 218-230.
Hu, J., et al., "Rippling ultrafast dynamics of suspended 2D monolayers, graphene," PNAS, 2016, E6555-E6561.
Lu, C., et al., "A comparison of the elastic properties of graphene—and fullerene-reinforced polymer composites: the role of filler morphology and size," Scientific Reports, 6, 2016, 31735-31744.
Samri, P., et al., "Graphene-based nanocomposites for structural and functional applications: using 2-dimensional materials in a 3-dimensional world," 2D Materials, 2, 2015, 30205-30211.
Park, S., "The puzzle of graphene commercialization," Nature Reviews—Materials, 1, 2016, 16085-16096.
Sivudu, K.S., "Mass production of high quality graphene," Nanotech Insights, Jun. 2012. http://www.nanowerk.com/spotlight/spotid=25744.php.
Liu, W., et al., "Synthesis and characterization of graphene and carbon nanotubes: A review on the past and recent developments," J. of Industrial and Eng. Chem., 20, 2014, 1171-1185.
Park S., et al., "Chemical methods for the production of graphenes," Nature Nanotechnology, 4, 2009, 217-224.
Gambir, R., "Chemically converted graphene: scalable chemistries to enable processing and fabrication," NPG Asia Materials, 7, 2015, 1-15.
Lee, H.C., et al., "Synthesis of single-layer graphene: A review of recent development," Procedia Chemistry, 19, 2016, 916-921.
Yadav, R., "Synthesis, characterization and prospective applications of nitrogen-doped graphene: A short review," J. of Science: Advanced Materials and Devices, 2, 2017, 141-149.
Hummers, W.S., et al.,"Preparation of Graphitic Oxide," J. Am. Chem. Soc., 80, 1958, 1339-1339.
Eni, Generalic,"Starch" Croatian-English Chemistry Dictionary & Glossary. Oct. 20, 2018. KTF-Split. Nov. 4, 2018.

* cited by examiner

FIG. 1 shows prior art of idealized structure of amylose and amylopectin (reference 41. Generalic, Eni. "Starch." *Croatian-English Chemistry Dictionary & Glossary*. 20 Oct. 2018. KTF-Split. 4 Nov. 2018)

FIG. 19 shows Brunauer, Emmett and Teller (BET) specific surface area data of carbon nanosheet produced from rice grain by this inventive subject matter.

| | | |
|---|---|---|
| BET Surface Area (m$^2$/g) | 2496.455714 | 23.86199373 +- |
| C | 78.87006675 | |
| Qm (cm$^3$/g STP) | 573.4761437 | |
| Slope (g/cm$^3$ STP) | 0.001721643 | 0.000016 +- |
| Y-Intercept (g/cm$^3$ STP) | 0.000022109 | 5.39946E-06 +- |
| Correlation | 0.999664618 | |
| Molecular CSA (nm$^2$) | 0.162 | *Nitrogen* |

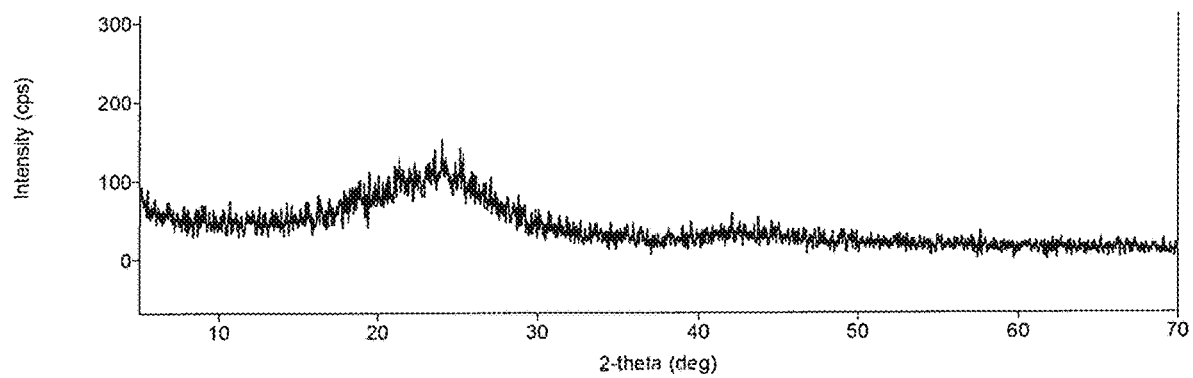
FIG. 20 shows X-ray diffraction pattern of carbon nanosheet prepared by this invention from sucrose.

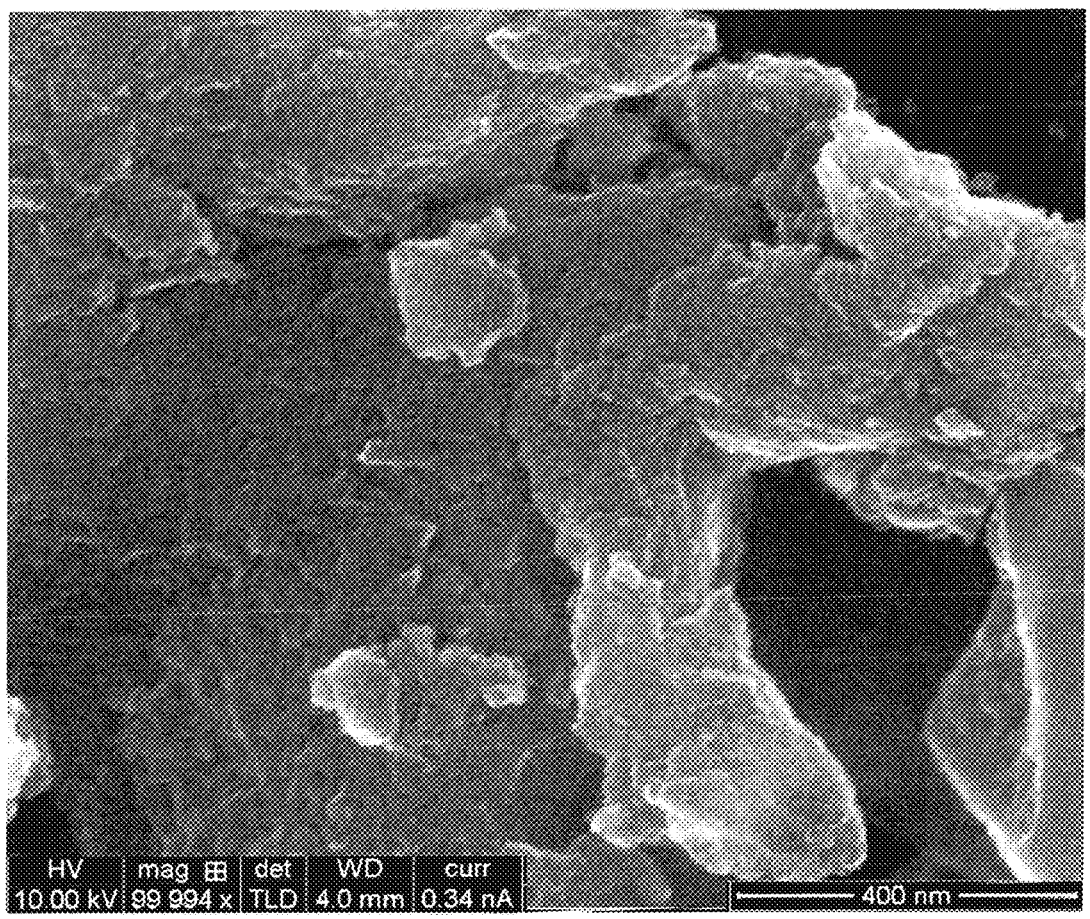
FIG. 21 shows a scanning electron micrograph of carbon nanosheet prepared by this invention from sucrose.

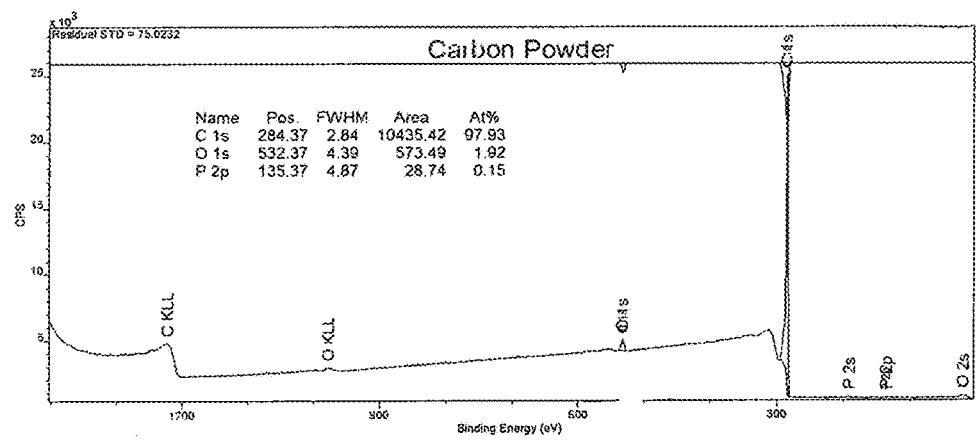
FIG. 22 shows X ray photoelectron Survey spectrum of carbon nanosheet produced from cassava root extract according to this invention.

Figure 23:
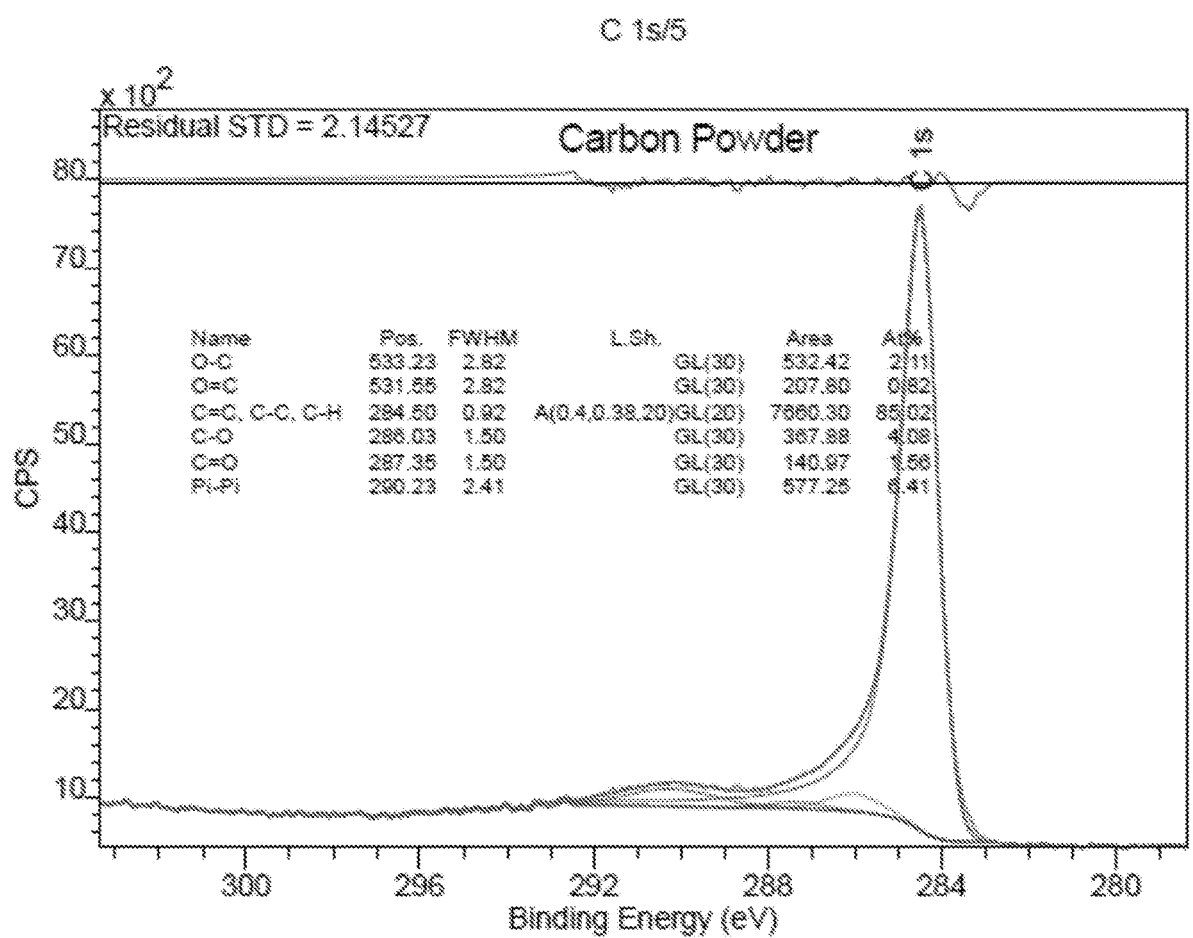

FIG. 23 shows high-resolution X-ray photoelectron spectrum of carbon nanosheet produced from cassava root extract according to this invention.

Figure 24:
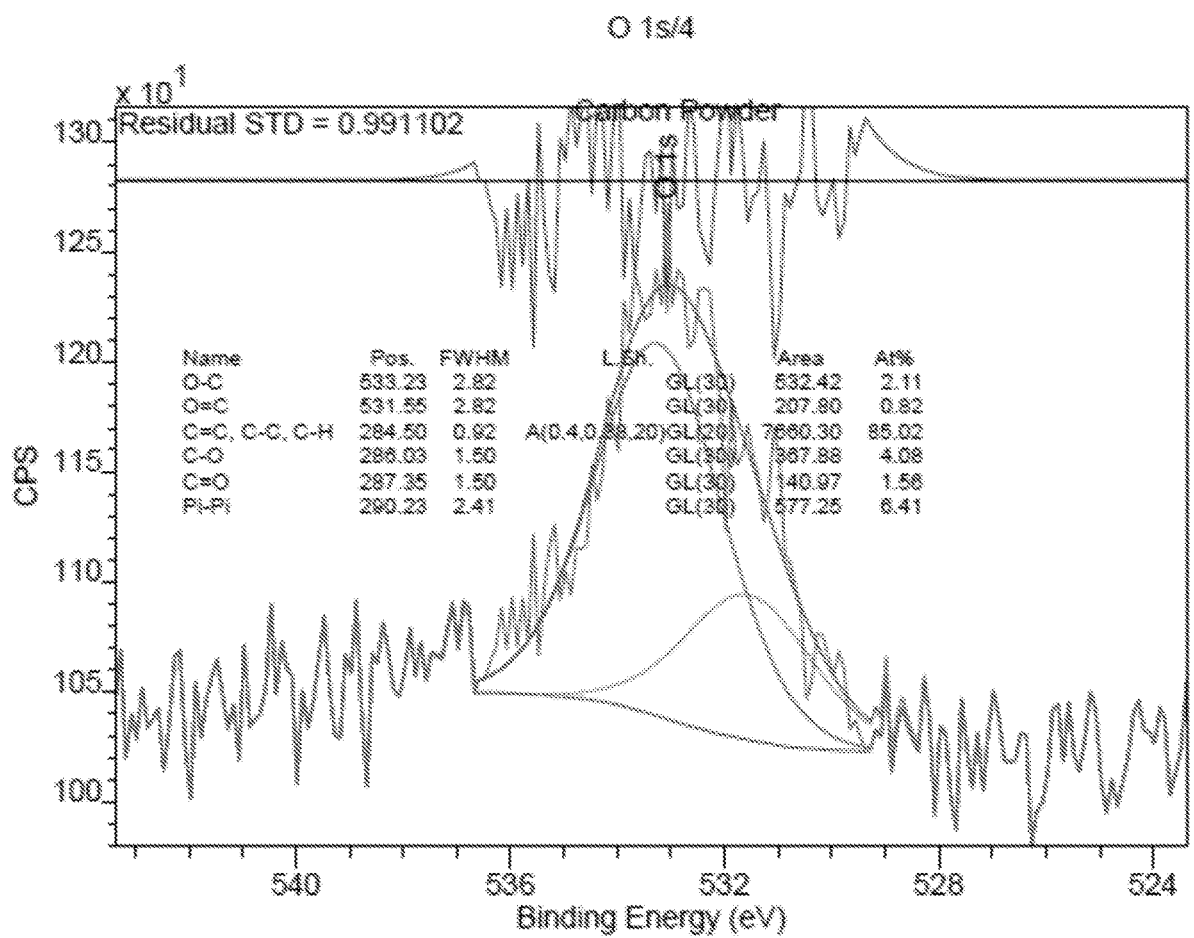

FIG. 24 displays high-resolution X-ray photoelectron spectrum of carbon nanosheet produced from cassava root extract according to this invention.

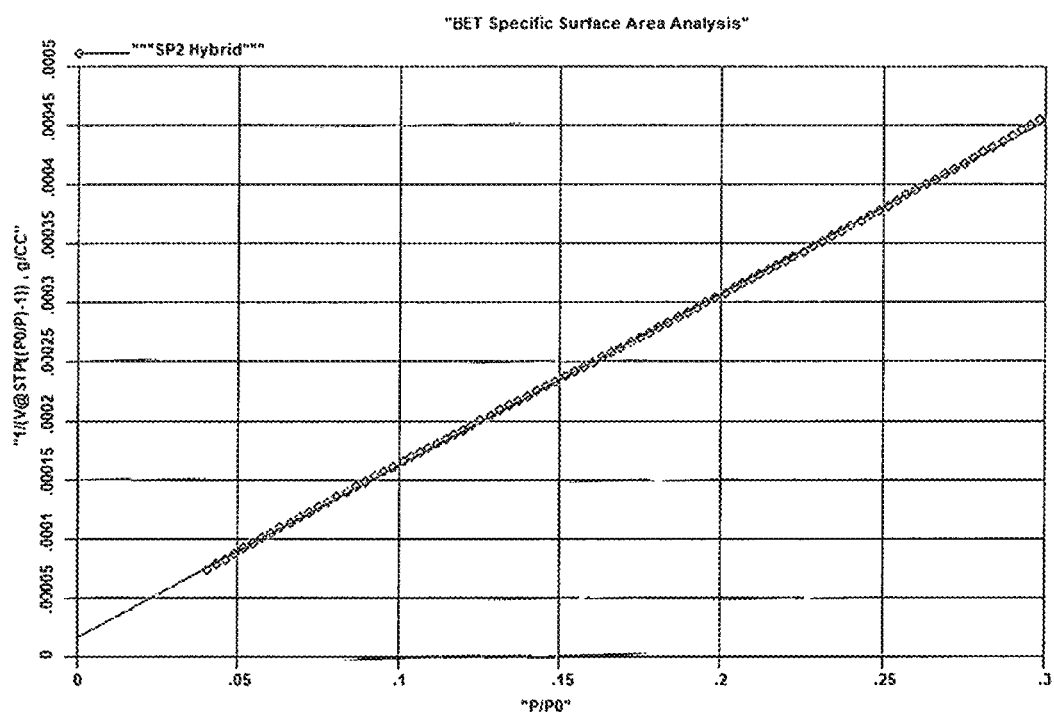
FIG. 25 shows Brunauer, Emmett and Teller (BET) specific surface area data of carbon nanosheet produced from cassava root extract by this inventive subject matter.

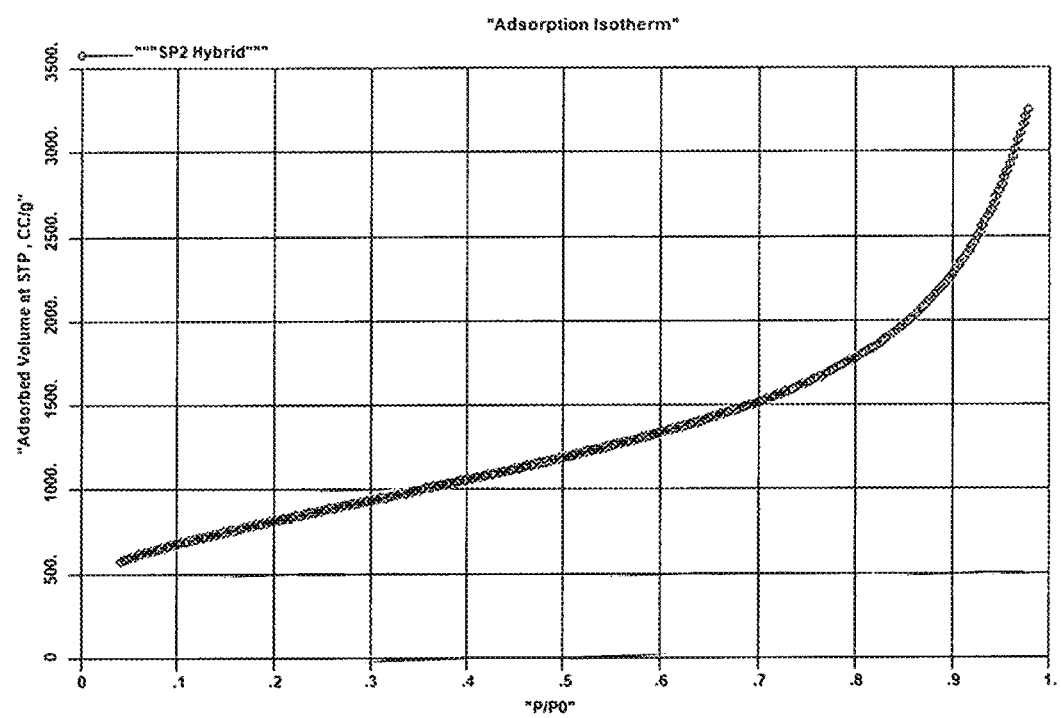
FIG. 26 is a nitrogen gas adsorption isotherm of carbon nanosheet powders produced from cassava root extract according to this inventive subject matter.

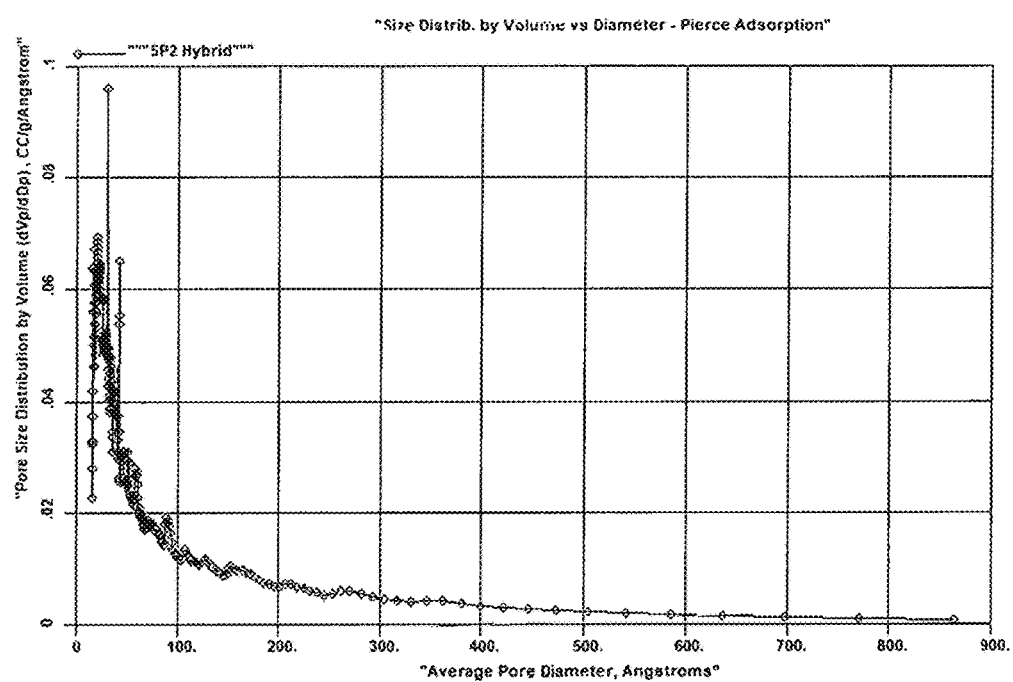
FIG. 27 shows a size distribution data of carbon nanosheet powders produced from cassava root extract according to this inventive subject matter.

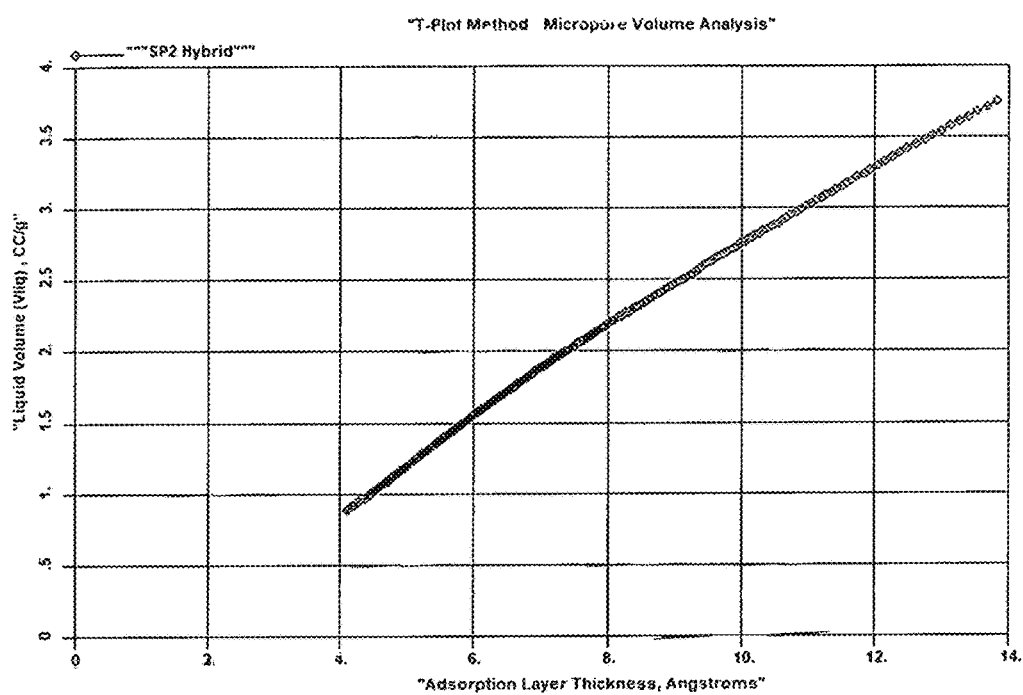
FIG. 28 shows a micropore volume analysis data of carbon nanosheet powders produced from cassava root extract according to this inventive subject matter.

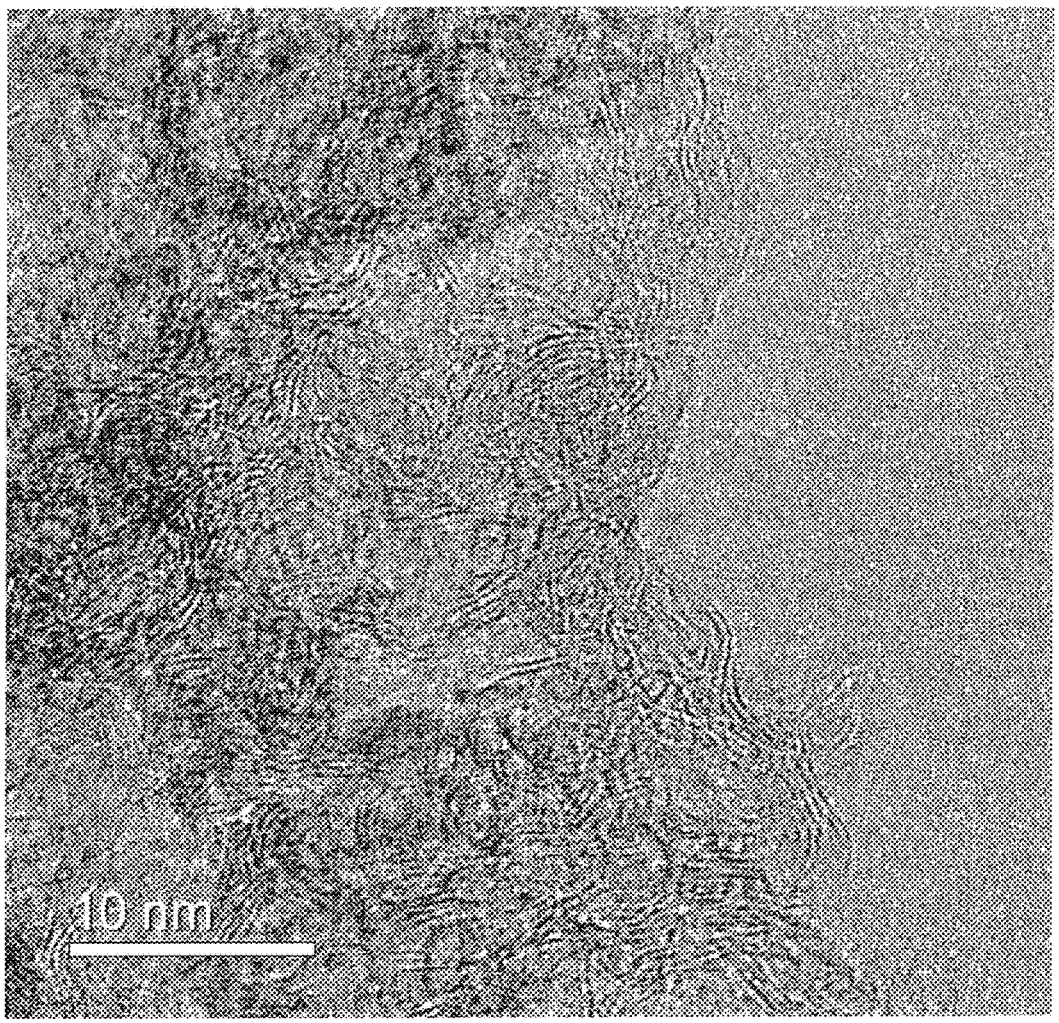
FIG. 29 is a high resolution transmission electron micrograph showing graphitic sheets of carbon produced from cassava root extract according to this inventive subject matter.

METHOD OF MAKING NANOMATERIALS FROM A RENEWABLE CARBON SOURCE

CROSSED-REFERENCE TO RELATED APPLICATIONS

This application claims priority to U.S. Provisional Patent Application Ser. No. 62/582,329, filed Nov. 7, 2017, which is hereby incorporated by reference in its entirety for all purposes.

BACKGROUND OF INVENTION

Field of Invention

This disclosure relates generally to the field of carbon nanosheet structures with extremely high surface area and pore volume. Specifically, this disclosure relates to new eco-friendly and cost-effective methods of making carbon nanosheets and its related carbon network nanomaterials from a renewable resource.

Background Art

Carbon nanosheet is undoubtedly a critical raw material for emerging technologies because of its superior properties for a vast array of applications including printable electronics, catalysis, sensors, biomedical devices, and energy storage devices. A specialty two-dimensional (2D) layered carbon material called graphene comprises of hexagonal network of sp2 bonded carbon atoms in a crystalline form is the basic structure for fullerenes (OD), carbon nanotubes (1D), and graphite (3D). Graphene has 2 atoms per unit cell, hence two sub lattices [1]-[9]. Graphene, the most preferred form of carbon nanostructure, has extraordinary properties, which originates from its electronic configuration and sp2 bonding. This results in high carrier mobility, ambipolar electric field effect, high ballistic conduction of charge carriers, high surface area, ultra-high mechanical strength, excellent thermal conductivity, high elasticity, room temperature quantum Hall effect, unexpected high absorption of white light, gas adsorption, unusual magnetic properties, charge-transfer interactions with molecules, and tuneable electronic bad gap [5]-[30].

A major challenge with carbon nanosheet is how to produce high specific surface area material at commercial scale at low cost and in reproducible manner. The common techniques for the production of graphene include chemical vapor deposition, epitaxial growth on substrates, chemical reduction of exfoliated graphene oxide, and liquid phase exfoliation of graphite [31]-[32]. All these methods are remarkably expensive and utilized a non-renewable carbonaceous raw material as the starting material.

In 2004, Novoselov et al. used adhesive tape to peel off single-layer of graphene sheet [14]-[15]. These researchers subsequently demonstrated the superior electric field effect and room temperature quantum hall effect in exfoliated single layer graphene sheets, and received Nobel Prize in 2010 [1], [14]-[15]. Although micromechanical exfoliation does not involve toxic chemicals, it is not ideal for commercial production of graphene, and as such several fundamental studies and prototype devices were obtained by using micromechanical cleavage graphene sheets [14]-[16].

Currently, liquid exfoliation of graphite is the most common process for making graphene based materials sold at the market place [31]-[40]. Specifically, carbon nanosheets produced by Staudenmaier's method or Hummer's method, as well as their modified methods, have dominated the market place [38]-[40]. Both methods use aggressive, expansive and utilize toxic chemicals to produce exfoliated carbon nanosheets with low specific surface area, about 600 $m^2/g$, which is a quarter of the theoretical surface of graphene (2630 $m^2/g$). Another concern is that the toxic precursors used in these methods create hazardous wastes [38]-[40].

In addition, current conventional manufacturing methods of graphene are complex with high cost of production resulting in expensive graphene products.

This disclosure provides a cost effective and new method of making carbon nanosheets from a renewable carbon source, which unexpectedly resulted in nanomaterials with exceptional high specific surface area and pore volume.

REFERENCES

1. E. Gerstner, "Nobel Prize 2010: Geim and Novoselov," Nature Physics, Advance online Publication, 2010.
2. A. K. Geim and K. S. Noveselov, "The rise of graphene," Nature Materials, 6, 183-191, 2007
3. J. C. Meyer et al., "The structure of suspended graphene sheets," Nature Letters, 446, 2007, 60-63.
4. A. K. Geim, "Graphene: status and prospects" Science, 324, 2009, 1530 0.1534.
5. K. S. Novoselov et al., "A roadmap for graphene," Nature Review, 490, 192-200, 2012.
6. A. C. Ferrari et al., "Science and technology roadmap for graphene, related two-dimensional crystals, and hybrid systems," Nanoscale, 7 (11), 2015, 4598-4810.
7. C. N. R. Rao et al., "Synthesis, characterization and selected Properties of graphene," Graphene: Synthesis, Properties, and Phenomena, Chapter 1, 1st Ed., ©2013 Wiley-VCH Verlag GmbH & Co. KGaA.
8. Z. Li et al., "Superstructured assembly of nanocarbons: fullerenes, nanotubes, and graphene, Chemical Reviews, 115, 2015, 7046-7117.
9. D. R. Dreyer, S. Park, C. W. Bielawski, and R. S. Ruoff, "The chemistry of graphene oxide," Chem. Soc. Rev., 39, 2010, 228-240.
10. Y. Jiang, et al., "Versatile Graphene Oxide Putty-Like Material, Advanced Materials, 28 (4G), 2016, 10287-10292.
11. H. Cheng et al., "Graphene fiber: a new material platform for unique applications, NPG Asia Materials, 6, 2014, 1-13.
12. K. S. Novoselov, "Graphene mind the gap," Nature Materials, 6, 2007, 720-721.
13. S. Zhou et al., "Substrate-induced bandgap opening in epitaxial graphene," Nature Materials, 6, 2007, 770-775.
14. K. S. Novoselov et al., "Electric field effect in atomically thin carbon films," Science, 306, 2004, 666-669.
15. K. S. Novoselov et al., "Room-temperature quantum hall effect in graphene," Science, 10, 2007, 1.
16. T. Ando, "The electronic properties of graphene and carbon nanotubes," NPG Asia Materials, 1, 2009, 17-21.
17. J. Zhang et al., "Tunable electronic properties of graphene through controlling bonding configurations of doped nitrogen atoms," Scientific Reports, 6, 2016, 28330-28340.
18. L. A. Ponomarenko et al., "Tunable metal-insulator transition in double-layer graphene heterostructures," Nature Physics, 7, 2011, 958-961.
19. K. Kim et al., "A role for graphene in silicon-based semiconductor devices," Nature, 479, 2011, 338-344.
20. F. Schwierz, "Graphene transistors," Nature Nanotechnology, 5, 2010, 487-496.

21. M. Zhao et al, "large-scale chemical assembly of atomically thin transistors and circuits," Nature Nanotechnology, 11, 2016, 954-960.
22. G. Wang et al., "Direct Growth of Graphene Film on Germanium Substrate," Scientific Reports, 3, 2013, 2465-2471.
23. T. J. Echterrneyer et al., "Strong plasmonic enhancement of photovoltage in graphene," Nature Communications, 2, 2011, 458-463.
24. Q. Miao et al., "Magnetic properties of N-doped graphene with high curie temperature," Scientific Reports, 6, 2016, 21832-21842.
25. A. A. Balandin, "Thermal properties of graphene and nanostructured carbon materials," Nature Materials, 10, 2011, 569-581.
26. F. Schedin et al, "Detection of individual gas molecules adsorbed on graphene," Nature Materials, 6, 2007, 652-655.
27. D. Deng et al, "Catalysis with 2D materials and their heterostructures," Nature Nanotechnology, 11, 2016, 218-230.
28. J. Hu et al., "Rippling ultrafast dynamics of suspended 2D monolayers, graphene," PNAS, 2016, E6555-E6561.
29. C. Lu et al., "A comparison of the elastic properties of graphene- and fullerene-reinforced polymer composites: the role of filler morphology and size," Scientific Reports, 6, 2016, 31735-31744.
30. P. Samri et al., "Graphene-based nanocomposites for structural and functional applications: using 2-dimensional materials in a 3-dimensional world," 2D Materials, 2, 2015, 30205-30211.
31. S. Park, "The puzzle of graphene commercialization," Nature Reviews—Materials. 1, 2016, 16085-16096.
32. K. S. Sivudu and Y. Mahajan, "Mass production of high quality graphene," Nanotech Insights, June 2012. http://www.nanowerk.corn/spotlight/spotid=25744.php
33. W. Liu, S. Chai, A. Mohamed, and U. Hashim, "Synthesis and characterization of graphene and carbon nanotubes: A review on the past and recent developments," J. of Industrial and Eng. Chem., 20, 2014, 1171-1185.
34. S. Park and R. S. Ruoff, "Chemical methods for the production of graphenes," Nature Nanotechnology, 4, 2009, 217-224.
35. S. Gambhir, R. Jalili, D. L. Officer, and G. G. Wallace, "Chemically converted graphene: scalable chemistries to enable processing and fabrication," NPG Asia Materials, 7, 2015, 1-15.
36. H. C. Lee et al., "Synthesis of single-layer graphene: A review of recent development," Procedia Chemistry, 19, 2016, 916 921.
37. R. Yadav and C. K. Dixit, "Synthesis, characterization and prospective applications of nitrogen-doped graphene: A short review," J. of Science: Advanced Materials and Devices, 2, 2017, 141-149.
38. L. V. Staudenmaier, "Verfahren zur Darstellung der Graphitsaure," Ber. Dtsch. Chem. Ges., 31, 1898, 1481.
39. G. Ruess and F. Vogt, "Hochstlamellarer Kohlenstoff aus Graphitoxyhydroxyd.," Monatsh. Chem., 78, 1948, 222.
40. W. S. Hummers and R. E. Offeman, "Preparation of Graphitic Oxide," J. Am. Chem. Soc., 80, 1958, 1339-1339.
41. Generalic, Eni. "Starch." *Croatian-English Chemistry Dictionary & Glossary.* 20 Oct. 2018. KTF-Split. 4 Nov. 2018

SUMMARY OF INVENTION

It is the object of this disclosure to provide a cheaper and eco-friendly method of producing carbon nanosheet with from renewable carbonaceous raw materials.

This disclosure provides a process that results in carbon nanosheet with undoubtedly superior combination of BET specific surface area (2956 $m^2/g$) and pore volume (5.0 cc/g) than ever reported previously; and also having an average pore diameter of 67.7 Angstroms, making its properties suitable for a vast array of applications including, but not limited to, catalysis, sensors, biomedical devices, and energy storage devices.

The intent of this summary is not to be a comprehensive description of the subject matter, but rather to provide a short overview of some of the subject matter's functionality. Other systems, methods, features and advantages here provided will become apparent to one with skill in the art upon examination of the following figures and detailed claims. It is intended that all such additional systems, methods, features and advantages included within this description, be within the scope of the claims.

BRIEF DESCRIPTION OF THE SEVERAL VIEWS OF THE DRAWING(S)

Figure 1:
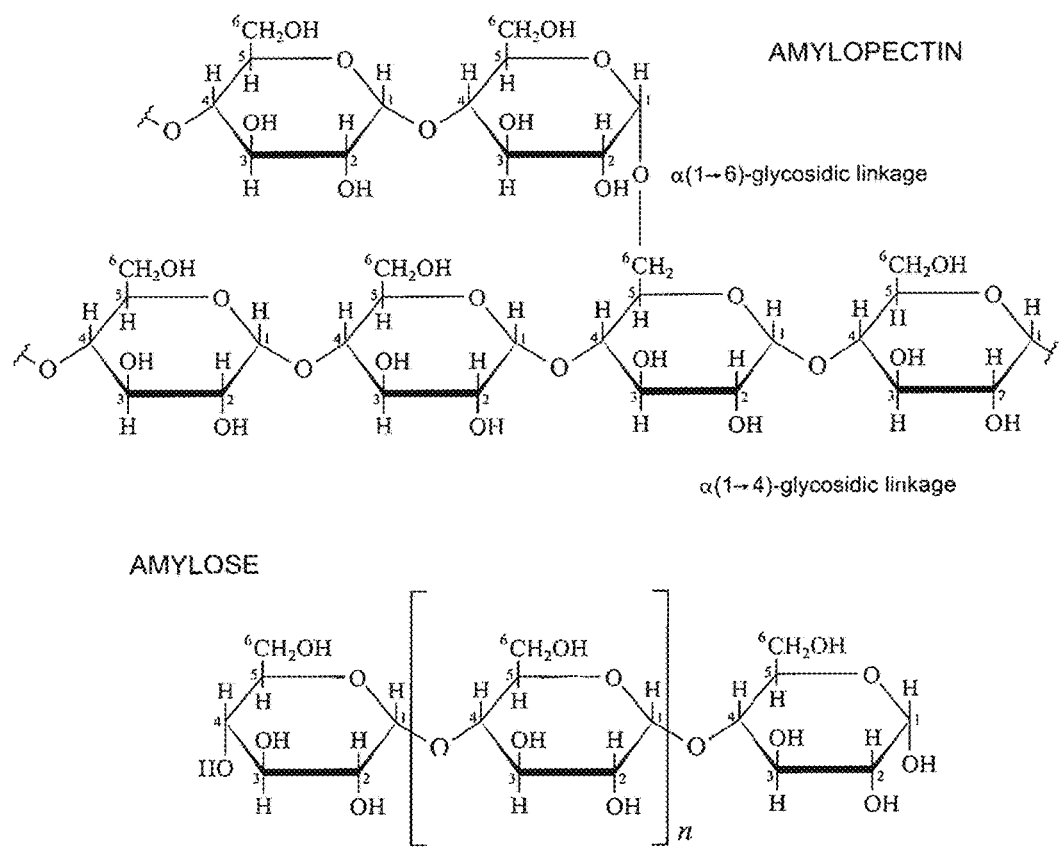

FIG. 1 shows prior art of idealized structure of amylose and amylopectin (reference [41]).

Figure 2:
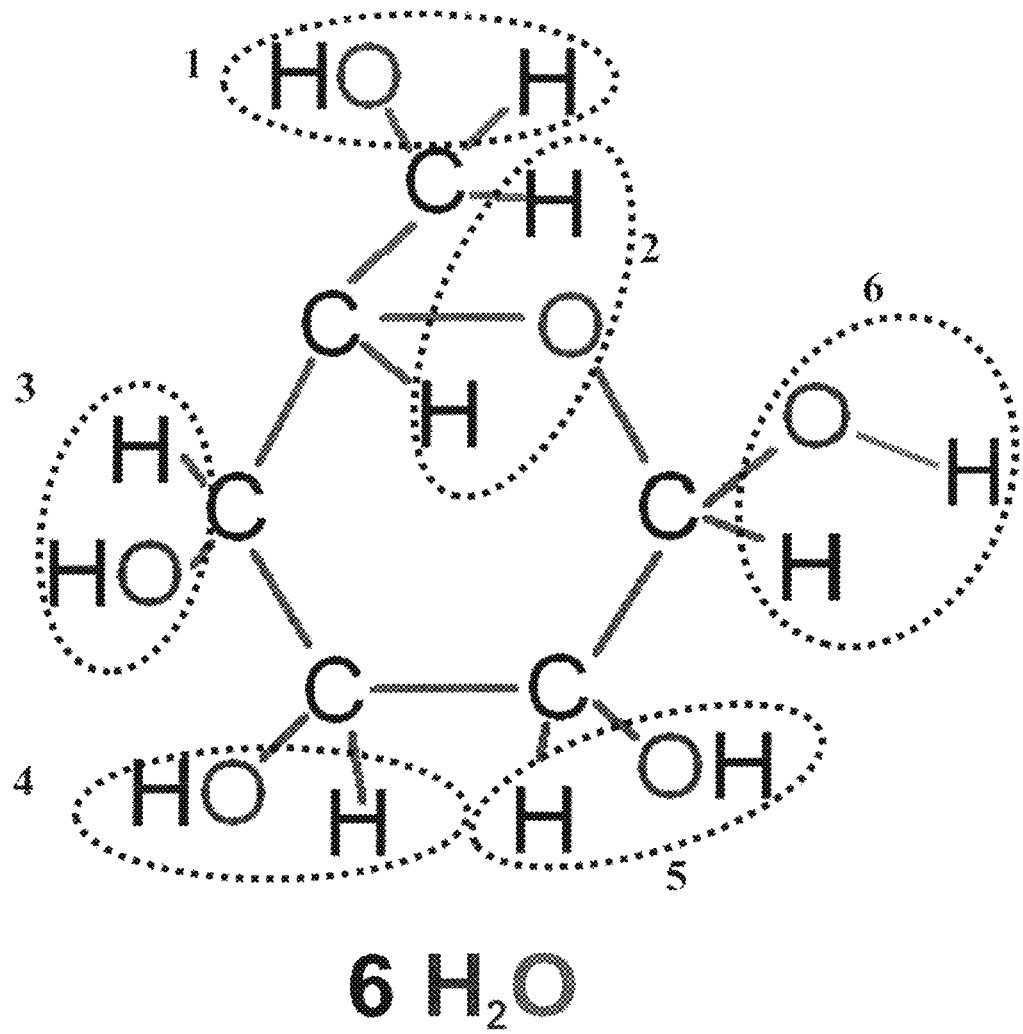
FIG. 2 depicts a schematic of removal of water molecules from glucose unit.

FIG. 2 depicts a schematic of removal of water molecules from glucose unit.

Figure 3:
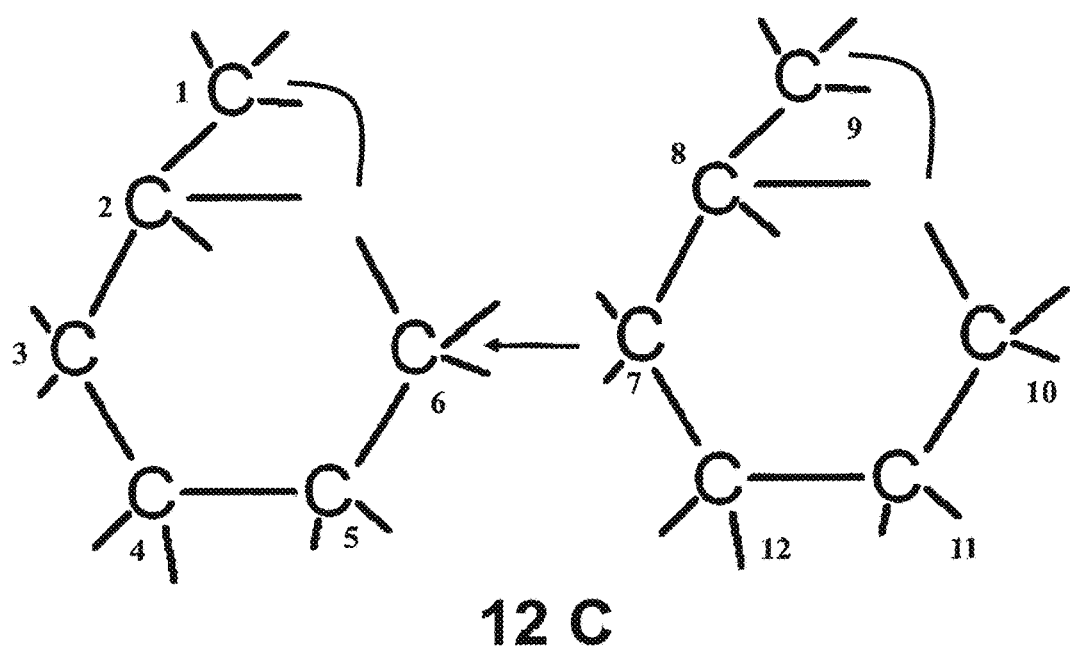
FIG. 3 shows a schematic of formation of a ring structure of carbon atoms with neighbouring unit.

FIG. 3 shows a schematic of formation of a ring structure of carbon atoms with neighboring unit.

Figure 4:
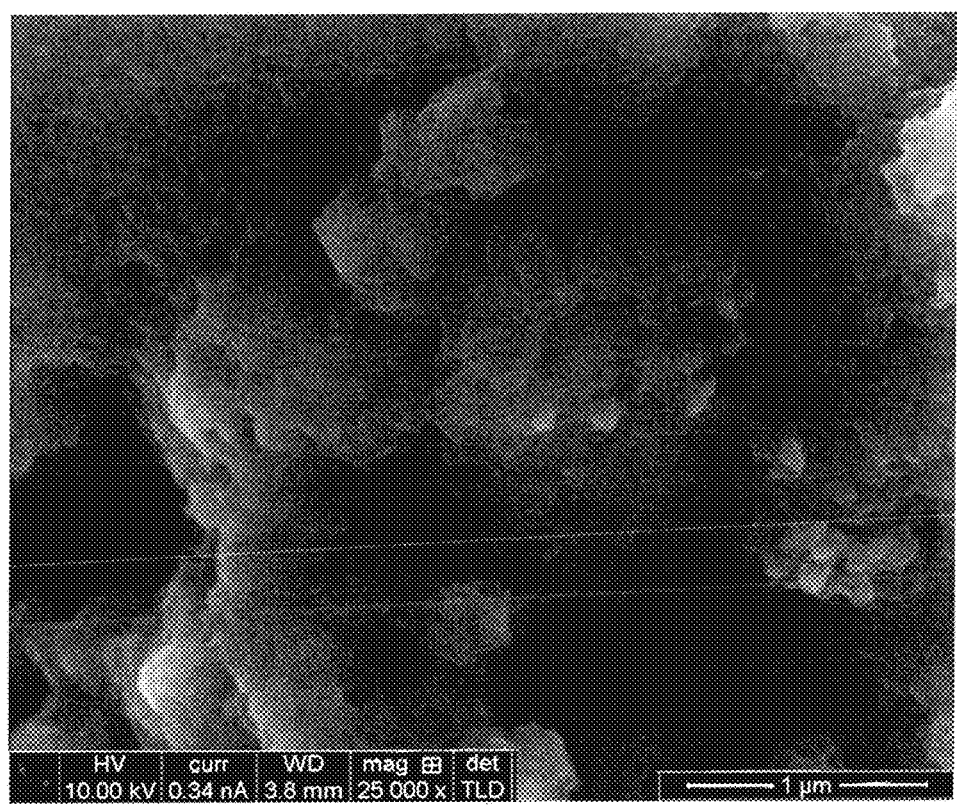
FIG. 4 is a scanning electron micrograph of intermediate carbon produced after pre-treatment of carbohydrate by this invention process.

FIG. 4 is a scanning electron micrograph of intermediate carbon produced after pre-treatment of carbohydrate by this invention process.

Figure 5:
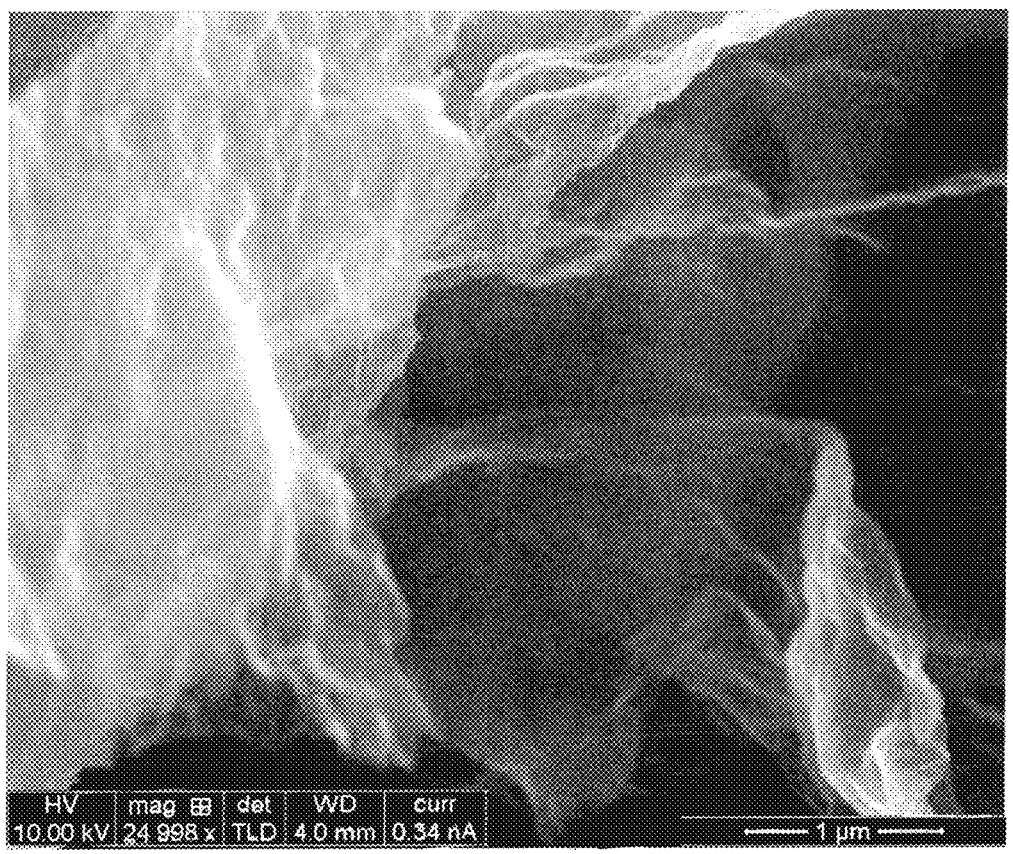
FIG. 5 shows a scanning electron micrograph of carbon nanosheet prepared by exposing intermediate carbon product to microwave irradiation according to the inventive subject matter.

FIG. 5 shows a scanning electron micrograph of carbon nanosheet prepared by exposing intermediate carbon product to microwave irradiation according to the inventive subject matter.

Figure 6:
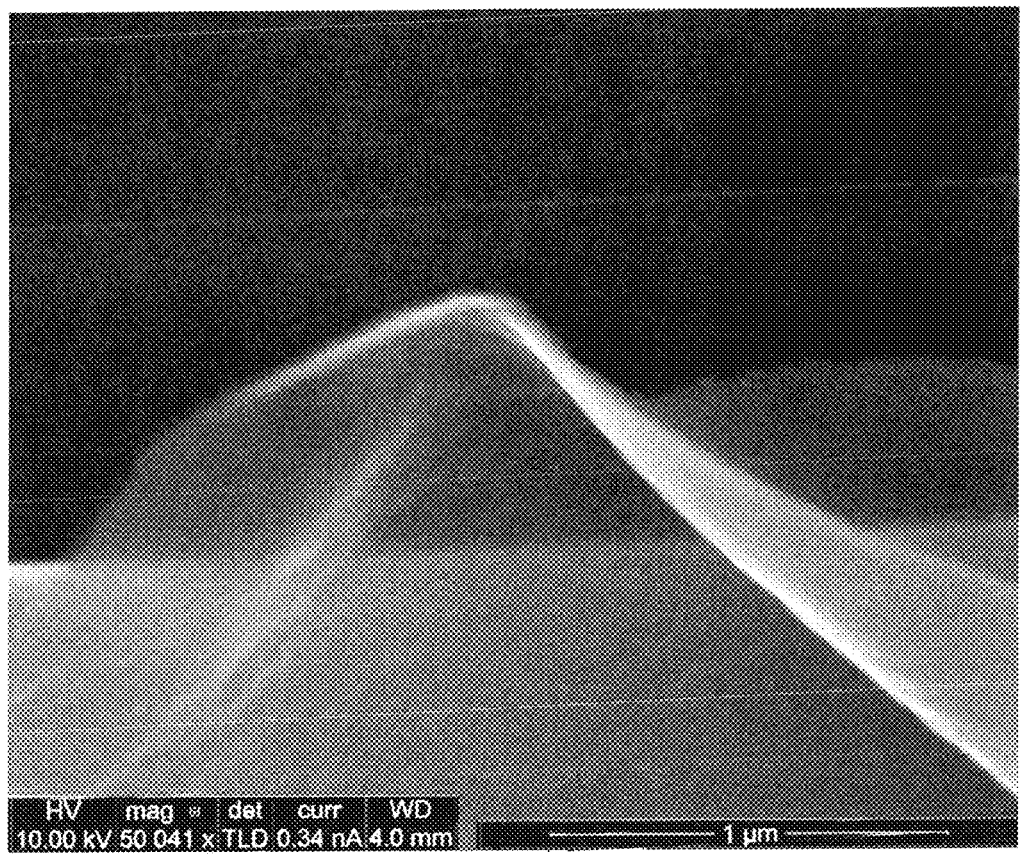
FIG. 6 shows a scanning electron micrograph of carbon nanosheet obtained after thermal treatment at elevated temperature according to this invention.

FIG. 6 shows a scanning electron micrograph of carbon nanosheet obtained after thermal treatment at elevated temperature according to this invention.

Figure 7:
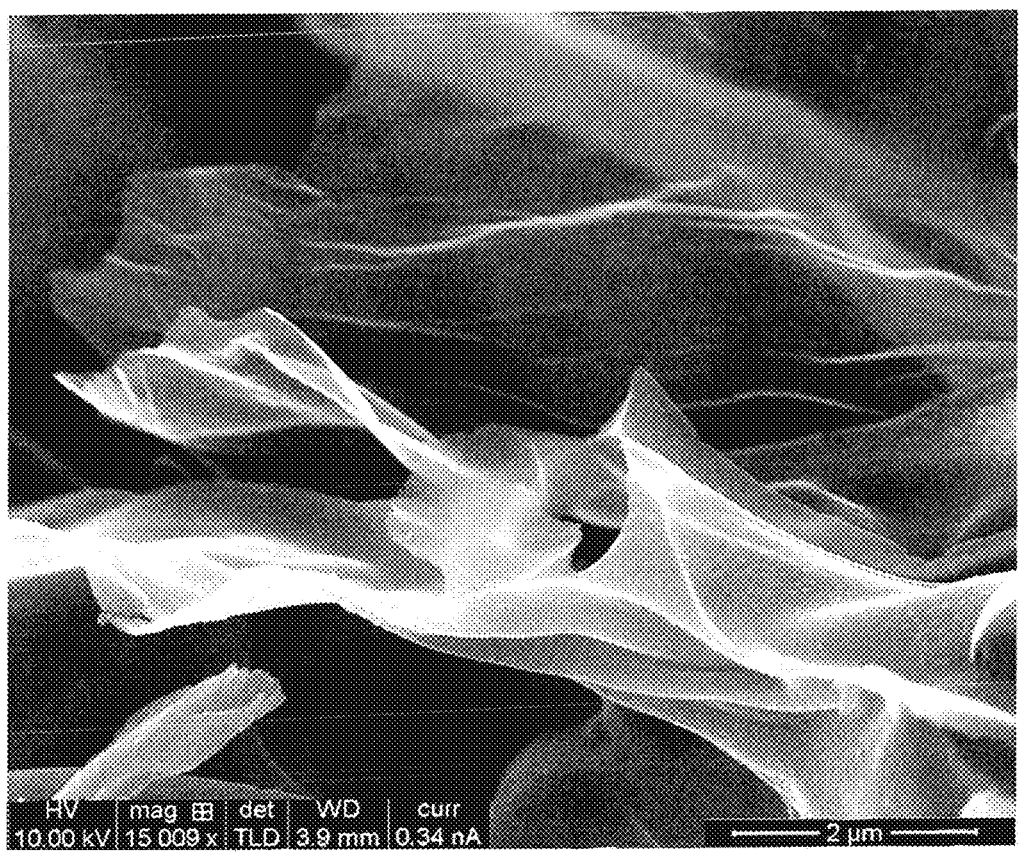
FIG. 7 shows a scanning electron micrograph of carbon nanosheet prepared from corn flour according to this invention.

FIG. 7 shows a scanning electron micrograph of carbon nanosheet prepared from corn flour according to this invention.

Figure 8:
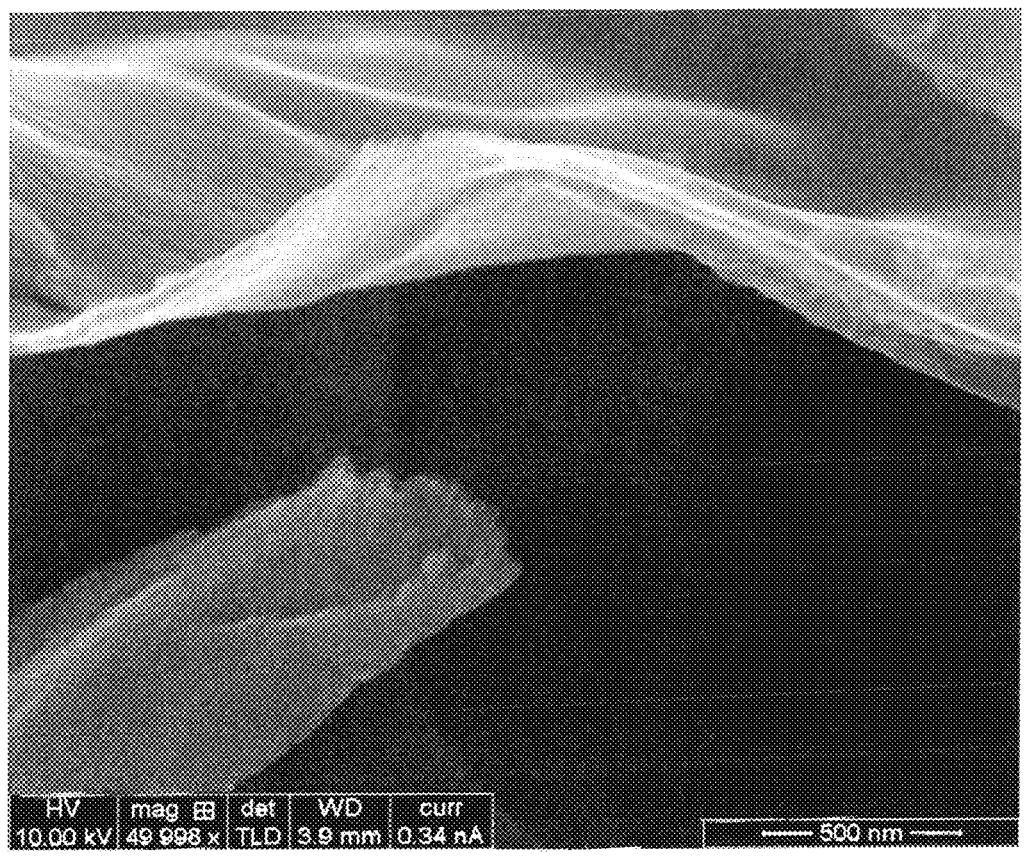
FIG. 8 shows a scanning electron micrograph is carbon nanosheet prepared from corn flour according to this invention.

FIG. 8 shows a scanning electron micrograph is carbon nanosheet prepared from corn flour according to this invention.

Figure 9:
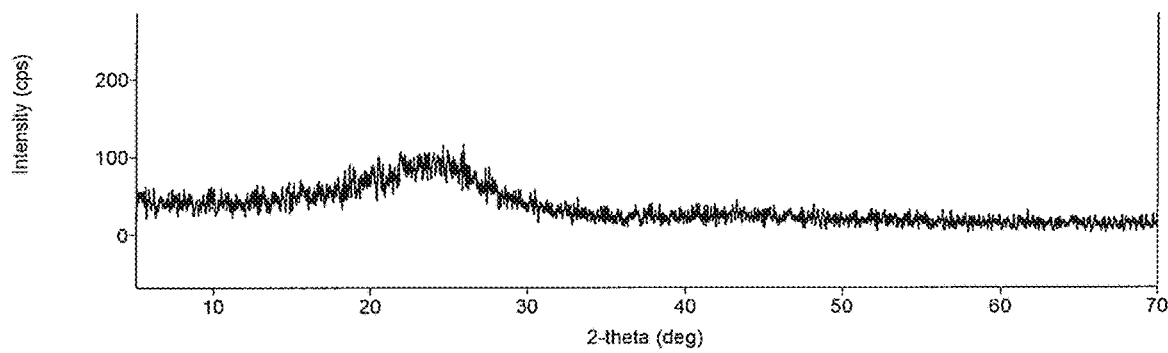
FIG. 9 is an X-ray diffraction pattern of carbon nanosheet prepared from corn flour according to this invention.

FIG. 9 is an X-ray diffraction pattern of carbon nanosheet prepared from corn flour according to this invention.

Figure 10:
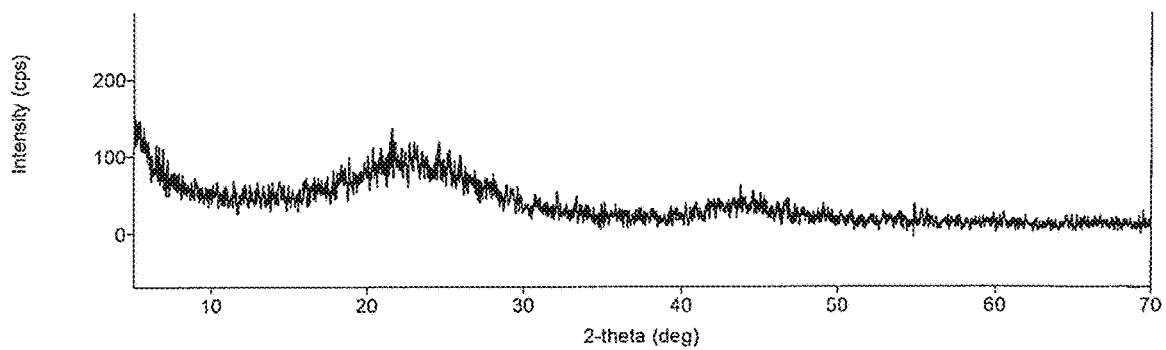
FIG. 10 shows an X-ray diffraction pattern of carbon nanosheet prepared from sucrose according to this inventive subject matter.

FIG. 10 shows an X-ray diffraction pattern of carbon nanosheet prepared from sucrose according to this inventive subject matter.

Figure 11:
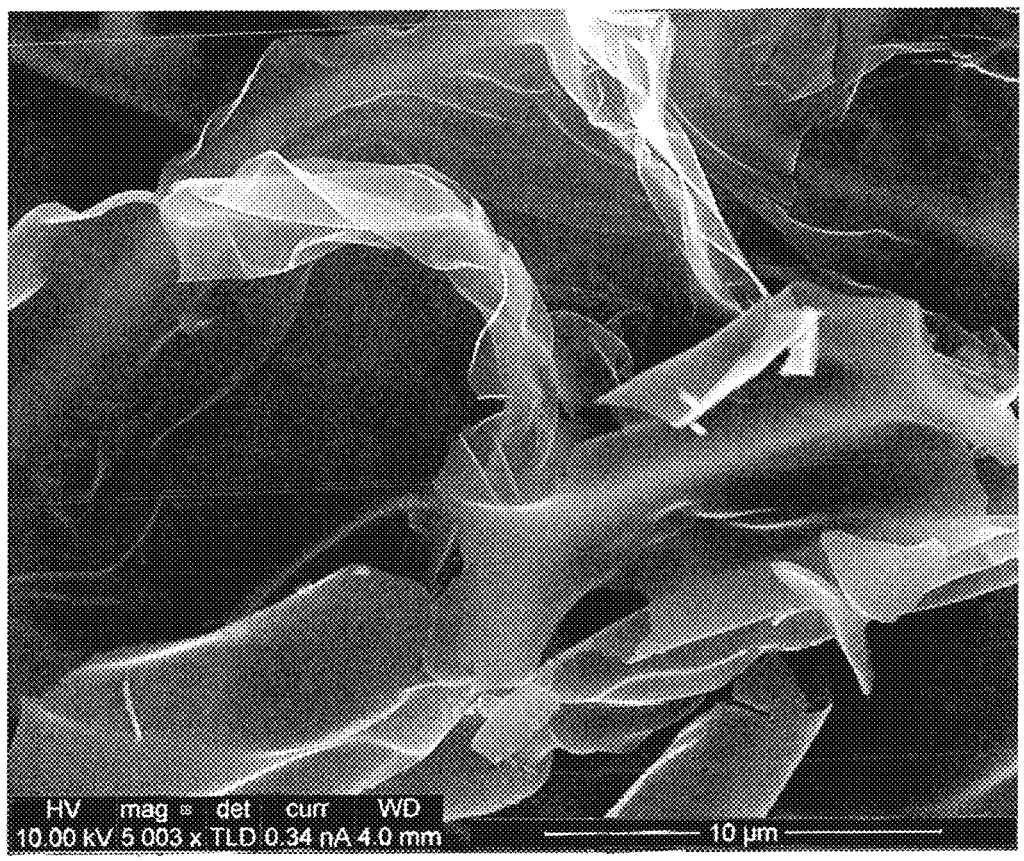
FIG. 11 shows scanning electron micrograph of carbon nanosheet prepared from sucrose according to this inventive subject matter.

FIG. 11 shows scanning electron micrograph of carbon nanosheet prepared from sucrose according to this inventive subject matter.

Figure 12:
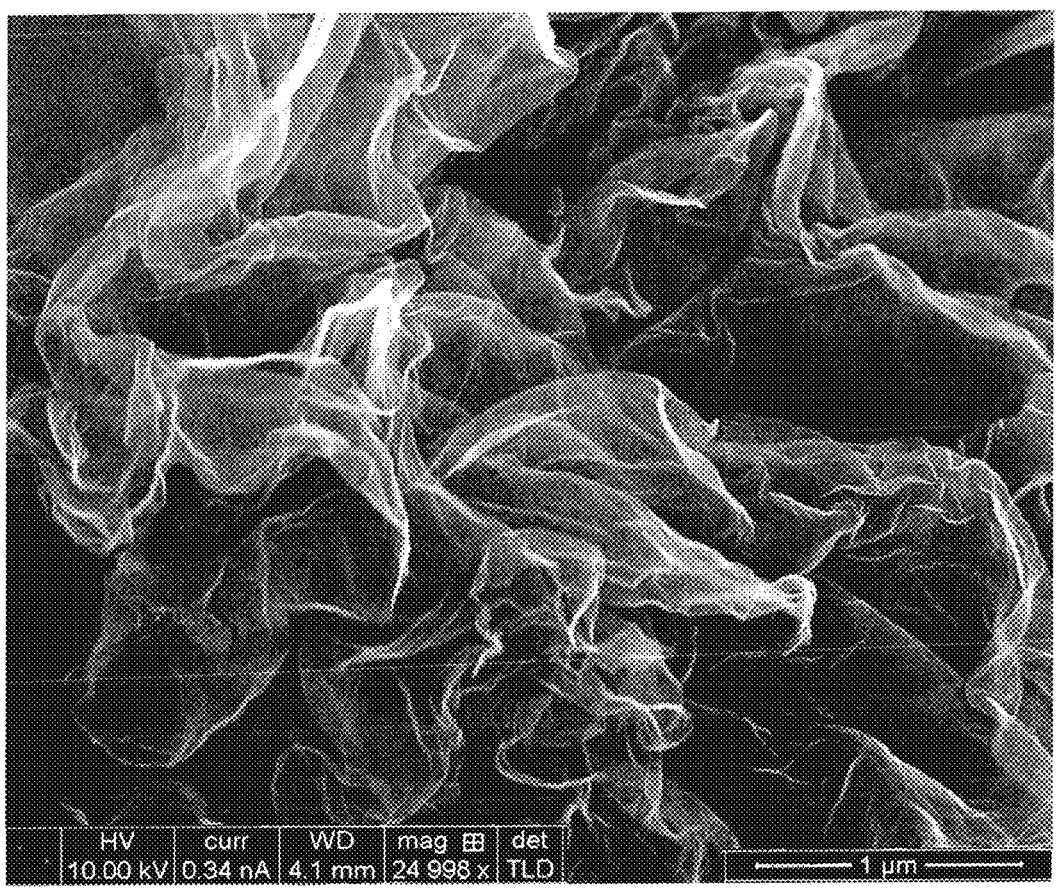
FIG. 12 is a scanning electron micrograph showing carbon nanosheet prepared from cassava root extract by this invention.

FIG. 12 is a scanning electron micrograph showing carbon nanosheet prepared from cassava root extract by this invention.

Figure 13:
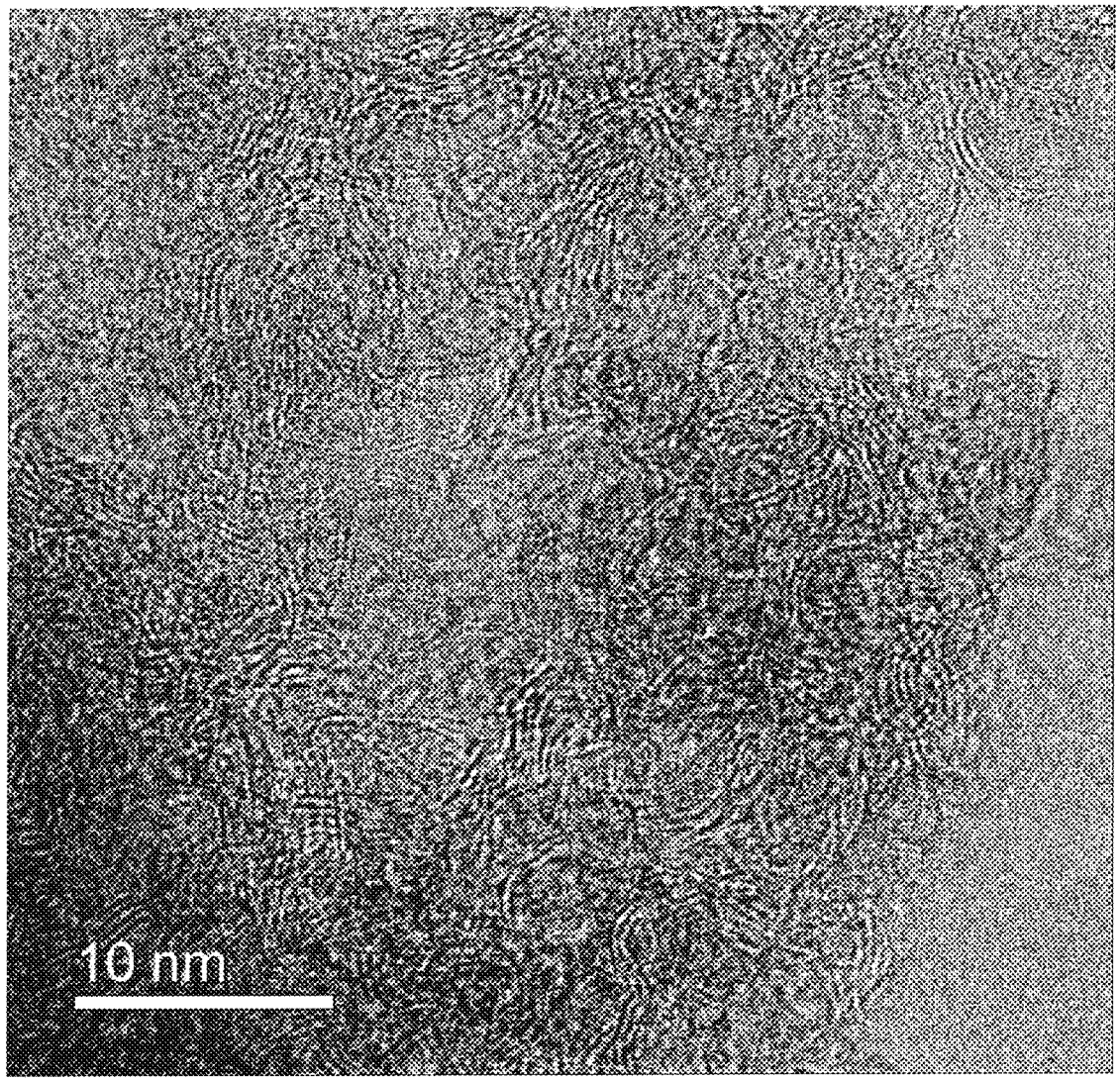
FIG. 13 is a transmission electron micrograph showing detailed nanosheet prepared by this invention from cassava root extract.

FIG. 13 is a transmission electron micrograph showing detailed nanosheet prepared by this invention from cassava root extract.

Figure 14:
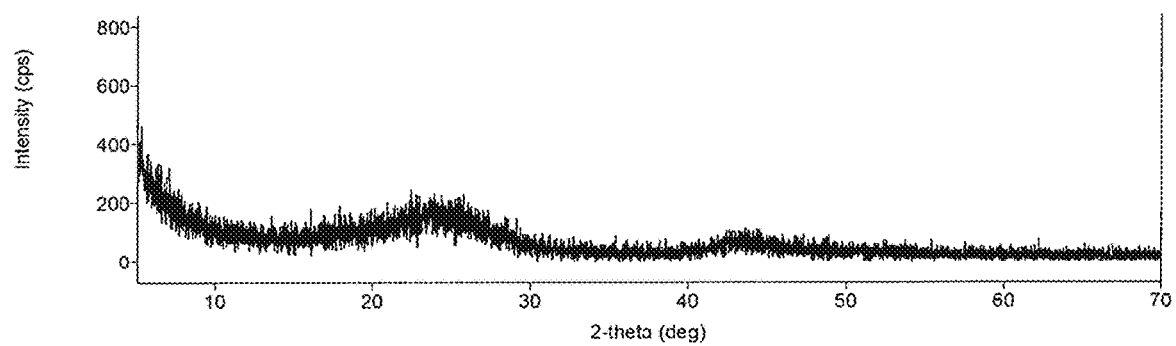
FIG. 14 shows an X-ray diffraction pattern of carbon nanosheet prepared by this invention from cassava root extract.

FIG. 14 shows an X-ray diffraction pattern of carbon nanosheet prepared by this invention from cassava root extract.

Figure 15:
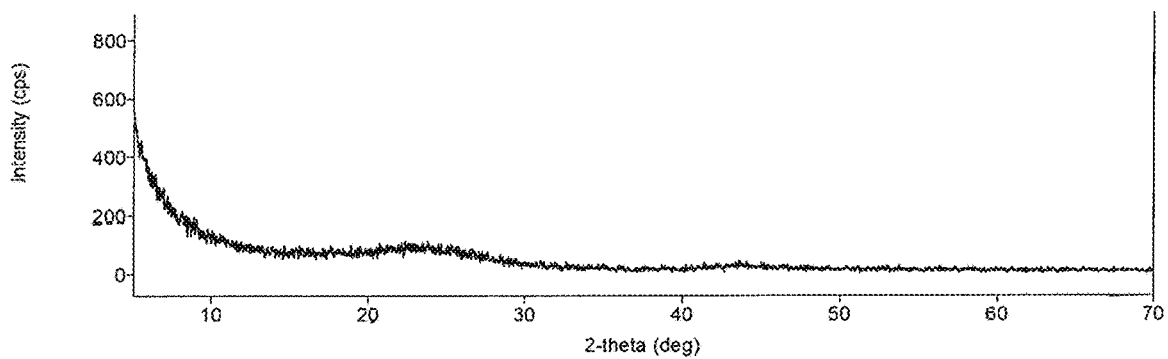
FIG. 15 is an X-ray diffraction pattern of carbon nanosheet obtained from rice grain according to this inventive subject matter.

FIG. 15 is an X-ray diffraction pattern of carbon nanosheet obtained from rice grain according to this inventive subject matter.

Figure 16:
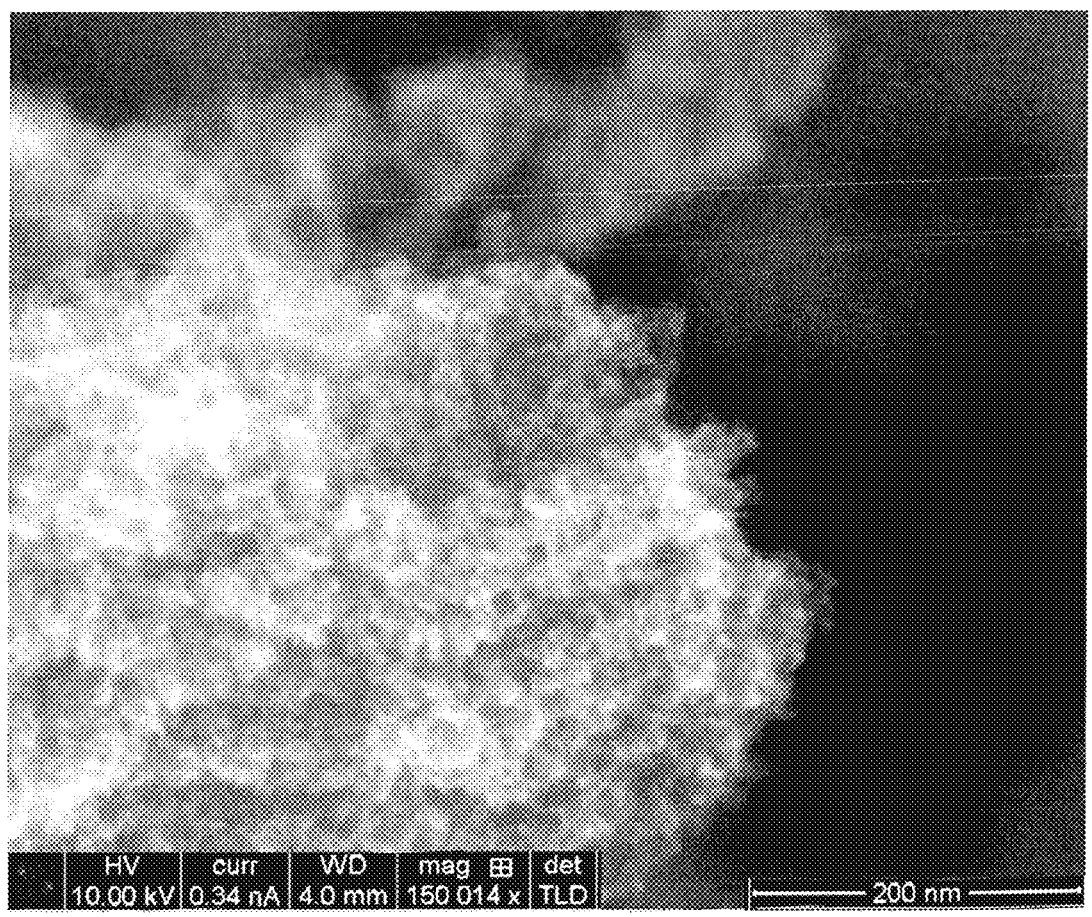
FIG. 16 shows a scanning electron micrograph of carbon nanosheet prepared by this invention from rice grain.

FIG. 16 shows a scanning electron micrograph of carbon nanosheet prepared by this invention from rice grain.

Figure 17:
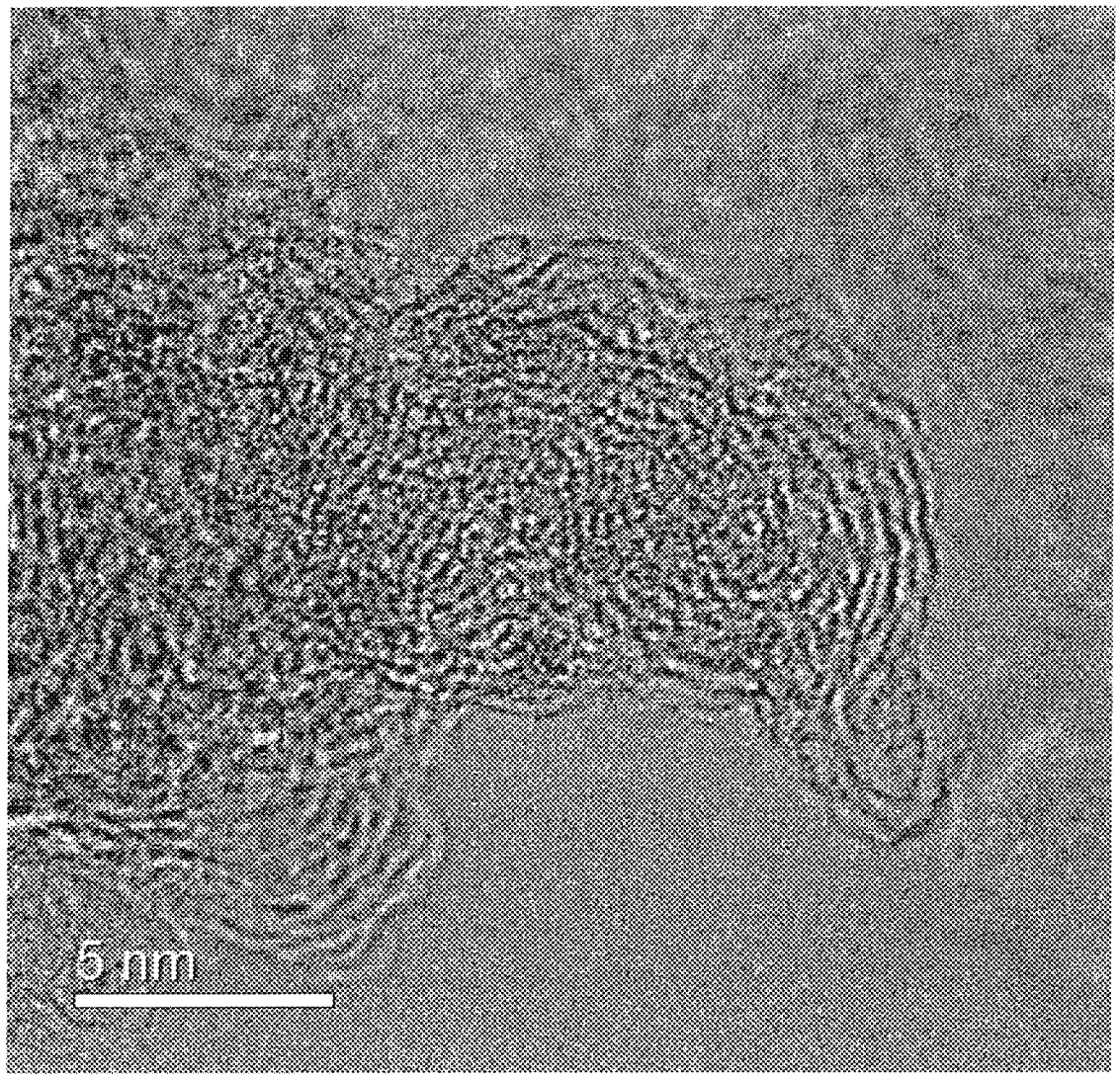
FIG. 17 is a high resolution transmission electron micrograph showing carbon nanosheet prepared from rice grain according this embodiment.

FIG. 17 is a high resolution transmission electron micrograph showing carbon nanosheet prepared from rice grain according this embodiment.

Figure 18:
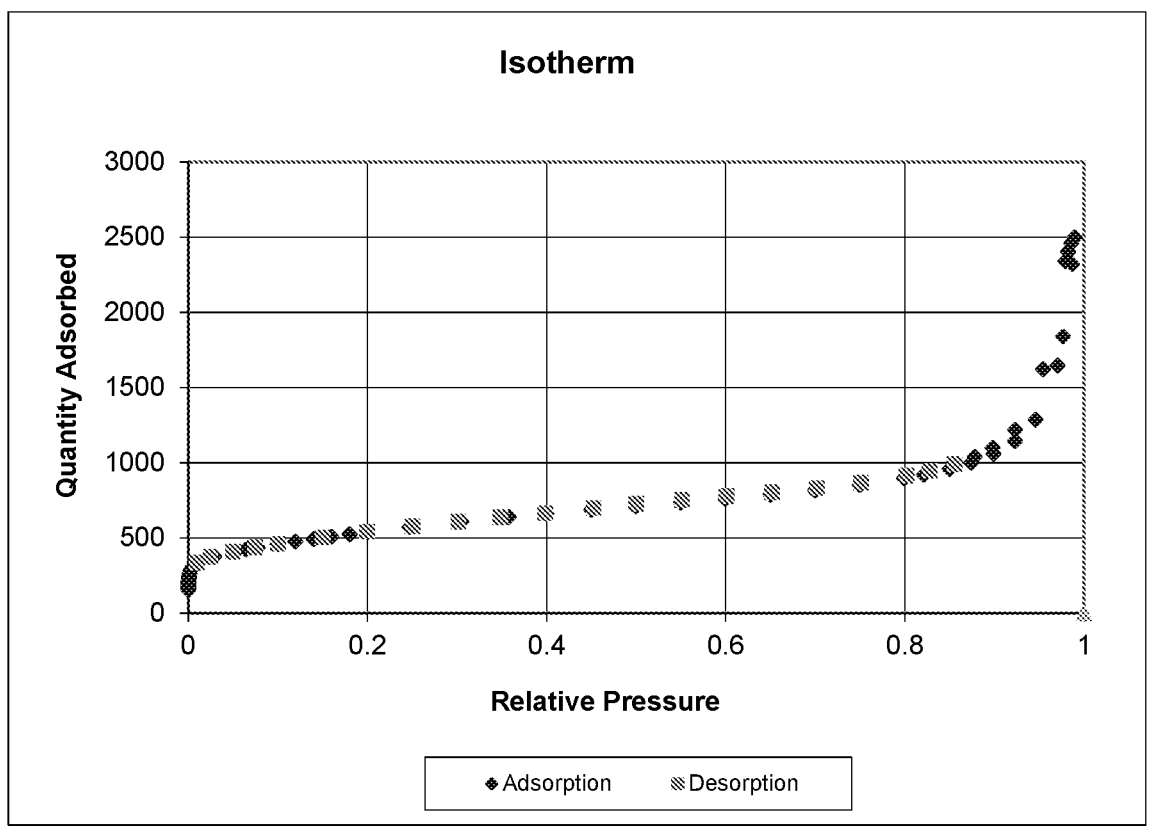
FIG. 18 is a nitrogen gas adsorption isotherm of carbon nanosheet powder prepared by this invention from rice grain.

FIG. 18 is a nitrogen gas adsorption isotherm of carbon nanosheet powder prepared by this invention from rice grain.

FIG. 19 shows Brunauer, Emmett and Teller (BET) specific surface area data of carbon nanosheet produced from rice: grain by this inventive subject matter.

FIG. 20 shows X-ray diffraction pattern of carbon nanosheet prepared by this invention from sucrose.

FIG. 21 shows a scanning electron micrograph of carbon nanosheet prepared by this invention from sucrose.

FIG. 22 shows X-ray photoelectron survey spectrum of carbon nanosheet produced from cassava root extract according to this invention.

FIG. 23 shows high-resolution X-ray photoelectron spectrum of carbon nanosheet produced from cassava root extract according to this invention.

FIG. 24 displays high-resolution X-ray photoelectron spectrum of carbon nanosheet produced from cassava root extract according to this invention.

FIG. 25 shows Brunauer, Emmett and Teller (BET) specific surface area data of carbon nanosheet produced from cassava root extract by this inventive subject matter.

FIG. 26 is a nitrogen gas adsorption isotherm of carbon nanosheet powders produced from cassava root extract according to this inventive subject matter.

FIG. 27 shows a size distribution data of carbon nanosheet powders produced from cassava root extract according to this inventive subject matter.

FIG. 28 shows a micropore volume analysis data of carbon nanosheet powders produced from cassava root extract according to this inventive subject matter.

FIG. 29 is a high resolution transmission electron micrograph showing graphitic sheets of carbon produced from cassava root extract according to this inventive subject matter.

DETAILED DESCRIPTION OF INVENTION

It has been discovered that carbon nanosheet with exceptional properties can be produced from a renewable carbonaceous raw materials such as cassava root extract, corn flour, rice grain, wheat flour, yam root extract, potatoes root extract, sugar beet roots extract and sucrose (generally referred as carbohydrates). The process for making carbon nanosheet from these carbohydrates is described as follows:

First, said carbohydrate is placed in solvent containing water or ethylene glycol or ethanol to aid hydrolysis. This is followed by gradual removing of glycosidic linkages in the carbohydrate via chemical and thermal activation. This pre-treatment step is critical for formation of intermediate fused carbon material, which contains limited amount of glycosidic bonds, hydroxyl and carbonyl groups. Chemicals that were effective were chosen from a group consisting of sodium hydroxide, hydrochloric acid, phosphoric acid, phosphorous acid, and nitric acid. In addition, catalyst such as yeast, aluminum-nickel alloy, cobalt, $B_2H_6$, zinc, and copper were explored and tested for their effectiveness.

The mixture of carbonaceous material and chemical and/or catalyst were exposed to approximately 45 to 1050° C., in air or inert atmosphere to aid formation of fused carbon network with a sheet-like morphology, called intermediate carbon material.

The final major step will involve thermochemical activation of the intermediate carbon based material to initiate chemical bonding of carbon atoms to form hexagonal planar network of mainly sp2 hybridization carbons. This occurs by at least switching oxygen atom and releasing hydroxyl portion of said intermediate carbon material to result in a short range or long range of aromatic ring structure or a mixture of both within the sheet that is retained and other groups or molecules are released. This final step is performed at temperature in the range of 500 to 1500° C., in an inert gas containing hydrogen gas. This results in a network of high surface area and pore volume sp2 bonded carbon nanosheet.

The resulting carbon nanosheet powders was typically washed with up to 10 volume % HCl to remove any remaining precursors and catalyst in the final product; followed by heat treatment at 700 to 1500° C., in inert atmosphere.

Alternatively, the final steps in treating the intermediate carbon product to form mainly sp2 hybridization carbons can be accomplished via chemical process. Such process involves treating the intermediate carbon product with a chemical chosen from the group consisting of hydrazine, $LiAlH_4$, $B_2H_6$, and $NaBH_4$; preferably hydrazine, and most preferably $NaBH_4$.

The process of producing carbon nanosheets in this disclosure starts with a renewable carbonaceous raw materials such as cassava root extract, corn flour, rice grain, wheat flour, and sucrose (generally referred as carbohydrates). These renewable carbonaceous materials contain high content of carbohydrates on water free basis, typically more than 70% by weight. Each renewable carbonaceous material contains different percentage of glucose, and fructose bonded together by glycosidic linkages to form polymeric units such as amylose and amylopectin. Although the molecular formula for glucose and fructose are the same, thus ($C_6H_{23}O_6$), they have different molecular structures. The structure of amylose and amylopectin, are well known and shown in FIG. 1.

In order to obtain a carbon nanosheet, each carbohydrate unit undergoes pre-treatment with a dehydration solution containing at least 1% of acid or catalyst. The pretreatment results in an intermediate carbon material with dark-grey color made of up of fused sheet-like morphology. The mechanism unfolds in two stages. First, the treated carbohydrate via chemical and thermal activation results in hydrolysis and removal of the glycosidic linkages in the polymeric carbohydrate unit to form individual glucose and fructose units.

This is followed by a second mechanism to remove water molecules from each of glucose or fructose units by the dehydration solution as schematically described in FIG. 2. This pretreatment is accomplished by gradually heating of the carbohydrate and hydration solution at 45 to 1050° C., preferably 80° C., for 36 hr. In the process, the carbon atoms rearrange to form a ring with neighboring carbon atoms as illustrated in FIG. 3. The hydration solution intercalates the layers of carbon after ring formation giving rise to a layered structure. FIG. 4 shows scanning electron micrograph of this intermediate carbon product after pre-treatment.

The intermediate carbon product undergoes a second treatment to exfoliate the intercalated carbon layers. It was discovered that several thermal and chemical methods can be used to exfoliate the carbon sheet. Thermal methods involve direct heating of intermediate carbon material. Radiant heating in a resistive furnace, on top of hotplate, laser irradiation and microwave irradiation were effective for exfoliating carbon nanosheet and removing of water molecules to form mainly sp2 bonded carbo nanosheets.

FIG. 5 shows scanning electron micrograph of carbon nanosheet obtained after microwave irradiation of intermediate carbon materials. Thermal exfoliation via microwave heating removed substantial amount of $H_2O$ molecules from the intermediate carbon materials. Elemental analysis confirmed drastic reduction in oxygen content from the intermediate carbon materials from 39.5 to 14.6 weight %.

Exfoliated carbon nanosheets were washed with 10 volume % HCl to remove remaining hydration solution and catalyst compounds. Subsequently, the resulting product was washed with de-ionized water several times until the pH was about 7. The resulting material was thermally treated at high temperatures in inert atmosphere to remove any groups attached to the nanosheet and terminate the ends with hydrogen. FIG. 6 confirmed the carbon nanosheets retained its sheet-like morphology, and carbon composition reached up to 94 weight %.

In an alternate method of producing carbon nanosheets, said carbohydrate was soaked in dehydration solution previously discussed. The mixture was directly exposed to rapid and uniform high temperature heating immediately after thorough and uniform mixing. This caused drastic removal of glycosidic bonds and release of water molecules, thereby forcing the resulting intermediate carbon materials to exfoliate in carbon nanosheet. Specifically, heating was accomplished by microwave irradiation or in oven preheated to at least 500° C. It was discovered that this method yielded carbon nanosheet.

In another method in this invention, after thorough and uniform mixing of said carbohydrate and dehydration solution containing excess deionized water, this mixture was slowly heated to temperature below 100° C., and held there for less than 24 hrs. The mixture formed a dark colored intermediate solution containing carbon. The dark intermediate solution was coated on a substrate to form thin films. The resulting films were exposed to high temperatures in inert atmosphere containing at least 2% by volume hydrogen gas. The films were slowly heated in the range of 700-1500° C., to form thin layer of conducting carbon nanosheet on substrate. Several substrates were tested including copper foil, silicon wafer, glass slides and quartz substrate.

In a different aspect of this invention, the final carbon nanosheet powders were dried overnight in vacuum and compounded with polymer resins, which resulted in composite having extraordinary properties. About 0.1-40.0 weight % of carbon nanosheet powder produced by this invention was used as filler in rubber and polymer resin such as high density polyethylene and polypropylene. The resulting nanocomposite exhibited improved strength and tolerance for chemical attack compared to the pure rubber or polymer resin.

The following examples are provided for the sake of concreteness, only to illustrate selected aspects of the inventive subject matter herein, and are not limiting on the inventive concept presented herein.

Example 1

Preparation of Carbon Nanosheet from Corn Flour

A total of 40.0 g of corn flour was placed in a 500 mL Pyrex glass beaker. About 20.0 g of phosphorous acid was dissolved in 100 mL of deionized water and the resulting solution was added to the corn flour. The mixture was stirred thoroughly and exposed to 80° C. for 36 hr., in a convection oven in air atmosphere. After heating, the sample formed an intermediate product, which was exposed to further heating on hotplate at 500° C. in air for 1 hr. The resulting product was washed thoroughly in de-ionized water to remove any unreacted precursors and followed by drying in an oven at 100° C. overnight.

The washed and dried sample was further heat treated in a tube furnace. About 10 g of sample was put in a porcelain combustion boat and placed inside quartz tube for thermal treatment. The reactor was connected with two mass flow meters/controllers (Alborg mass flow controllers) to monitor and control the flow rates of $H_2$ and Ar gases. All the mass flow controllers were turned on for 30 min to warm up and reach equilibrium temperature before flowing gases. The sample was ramped at 15° C./min from 20° C. to 1050° C. and held at 1050° C. for 1 hr. The thermal treatment was carried out in a gas mixture containing 10 vol. % hydrogen gas in balance of argon, flowing at a total rate of 100 mL/min. Scanning electron micrograph of resulting nanosheet are presented in FIG. 7 and FIG. 8. X-ray diffraction pattern showed in FIG. 9 confirmed the final product is made-up of predominantly carbon nanosheets.

Example 2

Preparation of Carbon Nanosheet from Sucrose

A total of 100 g of sucrose was placed in a 500 mL Pyrex glass beaker. A 300 mL of solvent consisting 50 vol % of ethylene glycol and 50 vol. % deionized water was added to the sucrose. The mixture was stirred thoroughly until all sucrose was dissolved in the solvent. About 25.0 g of phosphorous acid was added to the sucrose solution and exposed to 100° C. for 18 hr in a convection oven in air atmosphere to form intermediate mixture.

The intermediate mixture was subjected to rapid and uniform heating for 10 minutes by using microwave irradiation (1000 W). The final solid product after microwave heating was washed thoroughly in 10 vol. % HCl to remove any unreacted precursors, followed by drying in an oven at 100° C. overnight. X-ray diffraction pattern in FIG. 10 and SEM image in FIG. 11 revealed the product is made of carbon sheets.

Example 3

Preparation of Carbon Nanosheet from Cassava Extract

In this embodiment, about 50.0 g of phosphorous acid was dissolved in a 300 mL of solvent consisting 50 vol. % of ethanol and 50 vol. % deionized water. A total of 100 g of cassava extract was added to the solution and stirred thoroughly. The mixture was exposed to 100° C. for 24 hr in a convection oven in air atmosphere to form intermediate mixture.

After heating, the intermediate mixture was subjected to rapid and uniform heating for 10 minutes by using microwave irradiation (1000 W). The final solid product after microwave heating was washed thoroughly in 10 vol. % HCl to remove any unreacted precursors, followed by drying in an oven at 100° C. overnight.

The washed and dried sample was further treated in a tube furnace to remove oxygen containing group from the sample. The sample was ramped at 15° C./min from 20° C. to 1000° C. and held at 1000° C. for 1 hr. The thermal treatment was carried out in a gas mixture containing 50 vol. % argon and 50 vol. % hydrogen gas, flowing at a total rate of 1000 L/min. A typical sample size of 2 g was exposed to thermochemical treatment in the quartz reactor. FIG. 12 and FIG. 13 show scanning electron micrograph and transmission electron micrograph of carbon nanosheet prepared by this embodiment, respectively. Furthermore, X-ray diffraction data shows sample is made of carbon nanosheet due the low intensity of graphitic diffraction peaks in FIG. 14.

Example 4

Preparation of Carbon Nanosheet from Rice Grain

In this embodiment, a total of 60 g of rice grain was washed thoroughly in 300 mL of deionized water. The rice grain was filtrated and added to 300 mL of phosphoric acid, and stirred thoroughly. The mixture was exposed to 100° C. for 24 hr in a convection oven in air atmosphere to form intermediate mixture.

A sample size of 40 g of intermediate mixture was put in a quartz combustion boat and placed inside quartz tube for heat treatment. The intermediate sample was ramped at 15° C./min from 20° C. to 1000° C. and held at 1000° C. for 1 hr. The thermal treatment was carried out in a gas mixture containing 50 vol. % argon and 50 vol. % hydrogen gas, flowing at a total rate of 1000 L/min.

The final solid product after heating was washed thoroughly in 10 vol. % HCl and rinsed with deionized water. This was followed by second heat treatment in inert atmosphere at 800° C. for 3 hr. FIG. 15 presents X-ray diffraction data of resulting carbon nanosheet. Scanning electron micrograph, FIG. 16, and transmission electron micrograph, FIG. 17, show carbon nanosheet prepared by this embodiment. Also, the gas adsorption data present in FIG. 18 and FIG. 19, show the final product has a specific surface area measurement of 2496 $m^2/g$ and pore volume of 3.6 cc/g.

Example 5

Preparation of Carbon Nanosheet from Sucrose

A total of 100 g of sucrose was placed in a 500 mL Pyrex glass beaker. A 50 mL of deionized water was added to the sucrose and was stirred thoroughly until all sucrose was dissolved in the solvent. About 25.0 g of phosphoric acid was added to the sucrose solution and exposed to rapid and uniform heating for 10 minutes by using microwave irradiation (1000 W). The final solid product after microwave heating was washed thoroughly in 10 vol. % HCl to remove any unreacted precursors, followed by drying in an oven at 100° C. overnight. The presence of carbon nanosheet was confirmed by X-ray diffraction pattern, FIG. 20 and scanning electron micrograph, FIG. 21.

Example 6

Preparation of Nanosheet from Cassava Root Extract

In this embodiment, a total of 60 g of cassava root extract was added to 200 mL of phosphoric acid, and stirred thoroughly. The mixture was exposed to 160° C. for 3 hr., in a convection oven in air atmosphere to form intermediate mixture.

A sample size of 40 g of intermediate mixture was put in a quartz combustion boat and placed inside quartz tube for heat treatment. The intermediate sample was ramped at 15° C./min from 20° C. to 1000° C. and held at 1000° C. for 1 hr. The thermal treatment was carried out in a gas mixture containing 50 vol. % argon and 50 vol. % hydrogen gas, flowing at a total rate of 1000 L/min.

The final solid product after heating was washed thoroughly in 10 vol. % HCl and rinsed with deionized water. This was followed by second heat treatment in inert atmosphere at 800° C. for 3 hr. X-ray diffraction pattern of the resulting powder displayed in FIG. 21 shows extremely low diffraction peak intensities, confirming sample is made up of few layers of carbon nanosheets. In addition, X-ray photoelectron spectrum data presented in FIG. 22, FIG. 23 and FIG. 24 confirmed the resulting product has high carbon-carbon bonded content. The resulting product also has specific surface area of 2956 $m^2/g$ and pore volume of 5.0 cc/g as validated by technical data presented in FIG. 25, FIG. 26, FIG. 27 and FIG. 28. Finally, FIG. 29 presents evidence of graphitic layers in the high resolution transmission electron micrograph of the resulting carbon nanomaterial prepared by this invention.

What is claimed is:

1. A process for making carbon nanosheet material, said process comprising the steps of:
   providing a renewable carbohydrate source to a reactor comprising a solvent to obtain a soaked or dissolved carbohydrate source;
   adding a dehydration solution and a catalyst to the reactor comprising the soaked or dissolved carbohydrate source to obtain a reaction mixture, where
      the dehydration solution has a hydrogen ions concentration of at least approximately 1%, and
      the catalyst is chosen from the group consisting of platinum, palladium, $LiAlH_4$, nickel, yeast, aluminum-nickel alloy, cobalt, $B_2H_6$, zinc, $NaBH_4$, and copper;
   charging said reactor with air or inert gas;
   heating the reaction mixture to remove glycosidic linkages and water molecules from the carbohydrate thereby producing an intermediate mixture with sheet-like morphology; and
   further heating the intermediate mixture in inert gas to form a network of the carbon nanosheet material, wherein the carbon nanosheet material is in a particulate form, porous foam form, or dispersed in a solvent.

2. The process of claim 1, wherein said carbohydrate source comprises yam root extract or potatoes root extract.

3. The process of claim 1, wherein the carbohydrate source comprises cassava root extract, cassava root flour, tapioca flour, dried cassava root pulp, or dried and fried cassava root flakes.

4. The process of claim 1, wherein the carbohydrate source comprises sugarcane extract, sugar beet root extract, or sucrose.

5. The process of claim 1, wherein the carbohydrate source comprises rice grain, corn, or wheat grain.

6. The process of claim 1, wherein the solvent is chosen from the group consisting of distilled water, deionized water, ethanol, and ethylene glycol.

7. The process of claim 1, wherein said dehydration solution is chosen from the group consisting of sodium hydroxide, hydrochloric acid, phosphoric acid, phosphorous acid, and nitric acid.

8. The process of claim 1, further comprising the step of removing the dehydration solution by washing and diluting with excess distilled or deionized water prior to further heating of the intermediate mixture.

9. The process of claim 1, further comprising the step of removing said catalyst by washing, filtering, magnetic separation, sonication, sieving, or centrifugation prior to further heating of the intermediate mixture.

10. The process of claim 1, wherein the heating of the reaction mixture is carried out in air or inert gas at approximately 45 to 1050° C.

11. The process of claim 1, further comprising, prior to further heating the intermediate mixture, drying the intermediate mixture to produce an intermediate mixture in form of a powder, foam, or film on a substrate; wherein the intermediate mixture in form of powder, foam, or film on a substrate is heated in the inert gas at approximately 500 to 1500° C. to produce the carbon nanosheet material.

12. The process of claim 1, wherein said inert gas comprises argon, helium, or nitrogen.

13. The process of claim 12, wherein said inert gas further comprises a partial pressure of hydrogen gas.

14. The process of claim 1, wherein heating the reaction mixture or the intermediate mixture is carried out using a resistive element source, laser irradiation, or microwave irradiation.

15. The process of claim 1, further comprising the steps of:
   washing the carbon nanosheet material with hydrogen peroxide or hydrochloric acid to obtain washed carbon nanosheet material;
   rinsing the washed carbon nanosheet material with distilled or deionized water to obtain rinsed carbon nanosheet material;
   heating the rinsed carbon nanosheet material in a third inert gas at approximately 700 to 1500° C., thereby producing a high surface area carbon nanomaterial.

16. The process of claim 15, wherein the third inert gas comprises argon, helium, or nitrogen.

17. The process of claim 15, wherein the third inert gas further comprises a partial pressure of hydrogen gas.

18. The process of claim 15, wherein said heating is carried out using a resistive element source, laser irradiation, or microwave irradiation.

19. The process of claim 1, wherein the intermediate mixture is heated to a temperature of approximately 45 to 1050° C.

* * * * *